United States Patent
Li

(10) Patent No.: US 10,333,562 B2
(45) Date of Patent: Jun. 25, 2019

(54) RADIO SIGNAL PROCESSING SYSTEM, METHOD, AND APPARATUS, RADIO TRANSFORMATION MODULE, ROUTER, AND USER EQUIPMENT

(71) Applicant: Huawei Technologies Co., Ltd., Shenzhen (CN)

(72) Inventor: Nian Li, Shenzhen (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 0 days.

(21) Appl. No.: 15/556,085

(22) PCT Filed: Mar. 6, 2015

(86) PCT No.: PCT/CN2015/073750
§ 371 (c)(1),
(2) Date: Sep. 6, 2017

(87) PCT Pub. No.: WO2016/141506
PCT Pub. Date: Sep. 15, 2016

(65) Prior Publication Data
US 2018/0269907 A1    Sep. 20, 2018

(51) Int. Cl.
*H04B 1/00* (2006.01)
*H04L 27/10* (2006.01)
(Continued)

(52) U.S. Cl.
CPC ........... *H04B 1/0014* (2013.01); *H04B 1/005* (2013.01); *H04L 27/10* (2013.01); *H04L 27/12* (2013.01); *H04W 88/06* (2013.01); *H04B 1/00* (2013.01)

(58) Field of Classification Search
CPC ....... H04L 5/001; H04L 5/006; H04L 5/0094; H04L 27/12; H04L 27/10; H04W 36/30;
(Continued)

(56) References Cited

U.S. PATENT DOCUMENTS 6,914,950 B1    7/2005    Luneau
8,284,822 B2   10/2012    Rofougaran
(Continued)

FOREIGN PATENT DOCUMENTS

| CN | 1381155 A | 11/2002 |
|----|-----------|---------|
| CN | 1476678 A | 2/2004 |
| CN | 1984414   | 6/2007 |

OTHER PUBLICATIONS

Foreign Communication From A Counterpart Application, PCT Application No. PCT/CN2015/073750, English Translation of International Search Report dated Dec. 16, 2015, 2 pages.
(Continued)

*Primary Examiner* — Khanh C Tran
(74) *Attorney, Agent, or Firm* — Conley Rose, P.C.

(57) ABSTRACT

A radio signal processing method and apparatus includes first receiving a receive command that is sent by a router and that carries a receive frequency and a sampling frequency; receiving a radio signal corresponding to the receive frequency according to the receive frequency; performing sampling processing on the radio signal according to the sampling frequency to obtain a digital signal, and sending the digital signal to the router.

13 Claims, 12 Drawing Sheets

(51) Int. Cl.
*H04L 27/12* (2006.01)
*H04W 88/06* (2009.01)

(58) Field of Classification Search
CPC ........... H04W 72/0453; H04W 72/085; H04W 88/06; H04B 1/0014; H04B 1/005
See application file for complete search history.

(56) References Cited

U.S. PATENT DOCUMENTS

| | | | |
|---|---|---|---|
| 9,763,248 B2* | 9/2017 | Kim | H04B 7/2656 |
| 2002/0105932 A1 | 8/2002 | Miya | |
| 2009/0228626 A1* | 9/2009 | Hou | G06F 13/426 710/305 |
| 2011/0171917 A1 | 7/2011 | Behzad et al. | |
| 2012/0140859 A1 | 6/2012 | Lehr et al. | |
| 2013/0059625 A1* | 3/2013 | Clegg | H04W 84/105 455/552.1 |
| 2014/0051357 A1* | 2/2014 | Steer | H04L 63/0876 455/41.2 |
| 2015/0077231 A1* | 3/2015 | Kang | G08C 17/02 340/12.54 |
| 2015/0372711 A1* | 12/2015 | Qin | H03M 5/02 375/240 |
| 2018/0035281 A1* | 2/2018 | Erginler | H04M 15/85 |

OTHER PUBLICATIONS

Foreign Communication From A Counterpart Application, PCT Application No. PCT/CN2015/073750, English Translation of Written Opinion dated Dec. 16, 2015, 5 pages.

* cited by examiner

RADIO SIGNAL PROCESSING SYSTEM, METHOD, AND APPARATUS, RADIO TRANSFORMATION MODULE, ROUTER, AND USER EQUIPMENT

CROSS-REFERENCE TO RELATED APPLICATIONS

This application is a national stage application of International Patent Application No. PCT/CN2015/073750, filed on Mar. 6, 2015, which is herein incorporated by reference in its entirety.

TECHNICAL FIELD

The disclosure relates to the field of information technologies, and in particular, to a radio signal processing system, method, and apparatus, a radio transformation module, a router, and user equipment.

BACKGROUND

Development of information technologies is accompanied by an increasing quantity of radio services. For example, the radio services may include a video service received by using a wireless network and an audio service received by using the wireless network. Generally, a received radio signal is processed by using an intelligent terminal, so that the intelligent terminal can output the radio signal.

Currently, by means of a radio signal processing method, a radio signal receiving module first receives a radio signal sent by a radio service sender; then performs processing such as amplification, frequency conversion, filtering, sampling, demodulation, decoding, and format recovery on the radio signal, to obtain information used by intelligent terminals; and finally performs interface protocol encapsulation on the information used by the intelligent terminals and transmits the encapsulated packet to the intelligent terminals by using an interface, so that the intelligent terminals separately output corresponding radio signals.

However, when a radio signal is processed by using the radio signal receiving module, each radio signal receiving module may only receive and process the radio signal according to a standard protocol corresponding to each radio signal receiving module. Therefore, if multiple types of radio signals are to be received and processed, the corresponding radio signals are to be processed according to corresponding standard protocols by using multiple radio signal receiving modules. Consequently, radio signal processing complexity is relatively high.

SUMMARY

The disclosure provides a radio signal processing system, method, and apparatus, a radio transformation module, a router, and user equipment, so as to greatly reduce radio signal processing complexity.

Technical solutions used in the disclosure are disclosed below.

According to a first aspect, a radio signal processing system is provided, where the radio signal processing system includes a radio transformation module, a router, and user equipment, and the system includes the user equipment receives an operation instruction triggered by a user; the user equipment sends a receive command to the router according to the operation instruction, where the receive command carries a radio frequency parameter, and the radio frequency parameter includes a receive frequency and a sampling frequency; the router receives the receive command sent by the user equipment; the router forwards the receive command to the radio transformation module; the radio transformation module receives the receive command sent by the router; the radio transformation module receives a radio signal corresponding to the receive frequency according to the receive frequency; the radio transformation module performs sampling processing on the radio signal according to the sampling frequency, to obtain a digital signal; the radio transformation module sends the digital signal to the router; the router receives a first signal sent by the radio transformation module, where the first signal is a signal that is obtained after the radio transformation module receives the radio signal according to the receive frequency and samples the radio signal according to the sampling frequency; the router sends the first signal to the user equipment; the user equipment receives a second signal sent by the router, where the second signal is a signal that is obtained after the router forwards the first signal; and the user equipment performs demodulation and decoding processing on the second signal by using a software radio technology, to obtain a demodulated and decoded signal.

With reference to the first aspect, in a first possible implementation manner of the first aspect, before the step of performing, by the radio transformation module, sampling processing on the radio signal according to the receive command, the system further includes performing, by the radio transformation module, radio frequency amplification and frequency conversion processing on the radio signal, to obtain a signal after the radio frequency amplification and frequency conversion; and the step of sending, by the radio transformation module, the digital signal to the router includes sending, by the radio transformation module, the digital signal to the router by using a universal serial bus (USB) interface.

With reference to the first aspect, in a second possible implementation manner of the first aspect, before the step of sending, by the router, the first signal to the user equipment, the system further includes performing, by the router, filtering processing on the first signal by using the software radio technology.

With reference to the first aspect, in a third possible implementation manner of the first aspect, after the step of performing, by the user equipment, demodulation and decoding processing on the second signal by using a software radio technology, to obtain a demodulated and decoded signal, the system further includes performing, by the user equipment, format conversion processing on the demodulated and decoded radio signal, to obtain a signal that can be output by the user equipment.

With reference to the first aspect, in a fourth possible implementation manner of the first aspect, the second signal is a radio signal that is obtained after the router filters and forwards the first signal by using the software radio technology.

According to a second aspect, a radio signal processing method is provided, where the method is applied to a radio transformation module, and the method includes receiving, by the radio transformation module, a receive command sent by a router, where the receive command carries radio frequency parameter information, and the radio frequency parameter information includes a receive frequency and a sampling frequency; receiving, by the radio transformation module, a radio signal corresponding to the receive frequency according to the receive frequency; performing, by the radio transformation module, sampling processing on the radio signal according to the sampling frequency, to obtain a digital signal; and sending, by the radio transformation module, the digital signal to the router.

With reference to the second aspect, in a first possible implementation manner of the second aspect, before the step of performing, by the radio transformation module, sampling processing on the radio signal according to the receive command, the method further includes performing, by the radio transformation module, radio frequency amplification and frequency conversion processing on the radio signal, to obtain a signal after the radio frequency amplification and frequency conversion.

With reference to the second aspect or the first possible implementation manner of the second aspect, the sending, by the radio transformation module, the digital signal to the router includes sending, by the radio transformation module, the digital signal to the router by using a USB.

According to a third aspect, a radio signal processing method is provided, where the method is applied to a router, and the method includes receiving, by the router, a receive command sent by user equipment, where the receive command carries radio frequency parameter information, and the radio frequency parameter information includes a receive frequency and a sampling frequency; forwarding, by the router, the receive command to a radio transformation module; receiving, by the router, a first signal sent by the radio transformation module, where the first signal is a signal that is obtained after the radio transformation module receives a radio signal according to the receive frequency and samples the radio signal according to the sampling frequency; and sending, by the router, the digital signal to the user equipment.

With reference to the third aspect, in a first possible implementation manner of the third aspect, before the step of sending, by the router, the digital signal to the user equipment, the method further includes performing, by the router, filtering processing on the digital signal by using a software radio technology.

According to a fourth aspect, a radio signal processing method is provided, where the method is applied to user equipment, and the method includes sending, by the user equipment, a receive command to the router, where the receive command carries radio frequency parameter information, and the radio frequency parameter information includes a receive frequency and a sampling frequency; receiving, by the user equipment, a second signal sent by the router, where the second signal is a signal that is obtained after the router forwards a first signal, and the first signal is a signal that is obtained after a radio transformation module receives the radio signal according to the receive frequency and the radio transformation module samples the radio signal according to the sampling frequency; and performing, by the user equipment, demodulation and decoding processing on the digital signal by using a software radio technology, to obtain a demodulated and decoded signal.

With reference to the fourth aspect, in a first possible implementation manner of the fourth aspect, after the step of performing, by the user equipment, demodulation and decoding processing on the digital signal by using a software radio technology, to obtain a demodulated and decoded signal, the method further includes performing, by the user equipment, format conversion processing on the demodulated and decoded radio signal, to obtain a signal that can be output by the user equipment.

With reference to the fourth aspect or the first possible implementation manner of the fourth aspect, in a second possible implementation manner of the fourth aspect, the second signal is a radio signal that is obtained after the router filters and forwards the first signal by using the software radio technology.

According to a fifth aspect, a radio signal processing apparatus is provided, where the apparatus includes a receiving unit configured in the radio transformation module to receive a receive command sent by a router, where the receive command carries radio frequency parameter information, and the radio frequency parameter information includes a receive frequency and a sampling frequency, where the receiving unit is configured in the radio transformation module to receive a radio signal corresponding to the receive frequency according to the receive frequency; a sampling processing unit configured in the radio transformation module to perform, according to the sampling frequency, sampling processing on the radio signal received by the receiving unit, to obtain a digital signal; and a sending unit configured in the radio transformation module to send, to the router, the digital signal that is obtained by the sampling processing unit by performing sampling processing.

With reference to the fifth aspect, in a first possible implementation manner of the fifth aspect, the apparatus further includes a radio frequency amplification and frequency conversion processing unit; and the radio frequency amplification and frequency conversion processing unit is configured in the radio transformation module to perform radio frequency amplification and frequency conversion processing on the radio signal, to obtain a signal after the radio frequency amplification and frequency conversion.

With reference to the fifth aspect or the first possible implementation manner of the fifth aspect, in a second possible implementation manner of the fifth aspect, the sending unit is configured in the radio transformation module to send the digital signal to the router by using a USB interface.

According to a sixth aspect, a radio signal processing apparatus is provided, where the apparatus includes a receiving unit configured in the router to receive a receive command sent by user equipment, where the receive command carries radio frequency parameter information, and the radio frequency parameter information includes a receive frequency and a sampling frequency; a forwarding unit configured in the router to forward, to a radio transformation module, the receive command received by the receiving unit, where the receiving unit is further configured in the router to receive a first signal sent by the radio transformation module, where the first signal is a signal that is obtained after the radio transformation module receives a radio signal according to the receive frequency and samples the radio signal according to the sampling frequency; and a sending unit configured in the router to send the digital signal to the user equipment.

With reference to the sixth aspect, in a first possible implementation manner of the sixth aspect, the apparatus further includes a filtering processing unit; and the filtering processing unit is configured in the router to perform, by using a software radio technology, filtering processing on the digital signal received by the receiving unit.

According to a seventh aspect, a radio signal processing apparatus is provided, where the apparatus includes a sending unit configured in the user equipment to send a receive command to the router, where the receive command carries radio frequency parameter information, and the radio frequency parameter information includes a receive frequency and a sampling frequency; a receiving unit configured in the user equipment to receive a second signal sent by the router, where the second signal is a signal that is obtained after the router forwards a first signal, and the first signal is a signal that is obtained after a radio transformation module receives the radio signal according to the receive frequency and the radio transformation module samples the radio signal according to the sampling frequency; and a demodulation and decoding unit configured in the user equipment to perform, by using a software radio technology, demodulation and decoding processing on the digital signal received by the receiving unit, to obtain a demodulated and decoded signal.

With reference to the seventh aspect, in a first possible implementation manner of the seventh aspect, the apparatus further includes a format conversion unit; and the format conversion unit is configured in the user equipment to perform format conversion processing on the demodulated and decoded radio signal processed by the demodulation and decoding unit, to obtain a signal that can be output by the user equipment.

With reference to the seventh aspect or the first possible implementation manner of the seventh aspect, in a second possible implementation manner of the seventh aspect, the second signal is a signal that is obtained after the radio transformation module performs sampling according to the sampling frequency and further the router performs filtering by using the software radio technology.

According to an eighth aspect, a radio transformation module is provided, where the radio transformation module includes a receiver configured in the radio transformation module to receive a receive command sent by a router, where the receive command carries radio frequency parameter information, and the radio frequency parameter information includes a receive frequency and a sampling frequency, where the receiver is further configured in the radio transformation module to receive a radio signal corresponding to the receive frequency according to the receive frequency; a processor configured in the radio transformation module to perform, according to the sampling frequency, sampling processing on the radio signal received by the receiver, to obtain a digital signal; and a transmitter configured in the radio transformation module to send, to the router, the digital signal that is obtained by the processor by performing sampling processing.

With reference to the eighth aspect, in a first possible implementation manner of the eighth aspect, the processor is further configured in the radio transformation module to perform radio frequency amplification and frequency conversion processing on the radio signal, to obtain a signal after the radio frequency amplification and frequency conversion.

With reference to the eighth aspect or the first possible implementation manner of the eighth aspect, in a second possible implementation manner of the eighth aspect, the transmitter is further configured in the radio transformation module to send the digital signal to the router by using a USB interface.

According to a ninth aspect, a router is provided, where the router includes a receiver configured in the router to receive a receive command sent by user equipment, where the receive command carries radio frequency parameter information, and the radio frequency parameter information includes a receive frequency and a sampling frequency; a processor configured in the router to forward, to a radio transformation module, the receive command received by the receiver, where the receiver is further configured in the router to receive a first signal sent by the radio transformation module, where the first signal is a signal that is obtained after the radio transformation module receives a radio signal according to the receive frequency and samples the radio signal according to the sampling frequency; and a transmitter configured in the router to send the digital signal to the user equipment.

With reference to the ninth aspect, in a first possible implementation manner of the ninth aspect, the processor is configured in the router to perform, by using a software radio technology, filtering processing on the digital signal received by the receiver.

According to a tenth aspect, user equipment is provided, where the user equipment includes a transmitter configured in the user equipment to send a receive command to the router, where the receive command carries radio frequency parameter information, and the radio frequency parameter information includes a receive frequency and a sampling frequency; a receiver configured in the user equipment to receive a second signal sent by the router, where the second signal is a signal that is obtained after the router forwards a first signal, and the first signal is a signal that is obtained after a radio transformation module receives the radio signal according to the receive frequency and the radio transformation module samples the radio signal according to the sampling frequency; and a processor configured in the user equipment to perform, by using a software radio technology, demodulation and decoding processing on the digital signal received by the receiver, to obtain a demodulated and decoded signal.

With reference to the tenth aspect, in a first possible implementation manner of the tenth aspect, the processor is configured in the user equipment to perform format conversion processing on the demodulated and decoded radio signal, to obtain a signal that can be output by the user equipment.

With reference to the tenth aspect or the first possible implementation manner of the tenth aspect, in a second possible implementation manner of the tenth aspect, the second signal is a radio signal that is obtained after the router filters and forwards the first signal by using the software radio technology.

By means of the radio signal processing system, method, and apparatus and the radio transformation module that are provided in the disclosure, the radio transformation module first receives a receive command that is sent by a router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using a radio signal receiving module, in the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

By means of the radio signal processing system, method, and apparatus, and the router that are provided in the disclosure, the router first receives a receive command that is sent by user equipment and that carries a receive frequency and a sampling frequency, and forwards the receive command to a radio transformation module; then the router receives a signal that is obtained after the radio transformation module receives the radio signal according to the receive frequency and samples the radio signal according to the sampling frequency; and finally the router sends a digital signal to the user equipment. Compared with that currently a radio signal is received and processed by using a radio signal receiving module, in the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

By means of the radio signal processing system, method, and apparatus, and the user equipment that are provided in the disclosure, the user equipment first receives an operation instruction sent by a user, and sends a receive command that carries a receive frequency and a sampling frequency to a router according to the operation instruction; then receives a signal that is obtained after a radio transformation module samples, according to the sampling frequency, a radio signal that is sent by the router and that is received by the radio transformation module according to the receive frequency; and finally performs demodulation and decoding processing on a digital signal by using a software radio technology, to obtain a demodulated and decoded signal. Compared with that currently a radio signal is received and processed by using a radio signal receiving module, in the disclosure, the user equipment sends a receive command that carries a receive frequency and a sampling frequency to the router, so that the router can forward the receive command to the radio transformation module, and the radio transformation module receives and processes a radio signal according to the receive frequency and the sampling frequency, that is, by sending the receive command that carries the receive frequency and the sampling frequency to the router, the user equipment obtains the radio signal, without having to change different receiving and processing modules. Therefore, radio signal processing complexity can be greatly reduced.

BRIEF DESCRIPTION OF DRAWINGS

To describe the technical solutions in the disclosure or in the prior art more clearly, the following briefly describes the accompanying drawings for describing the disclosure or the prior art. The accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the disclosure.

Figure 1:
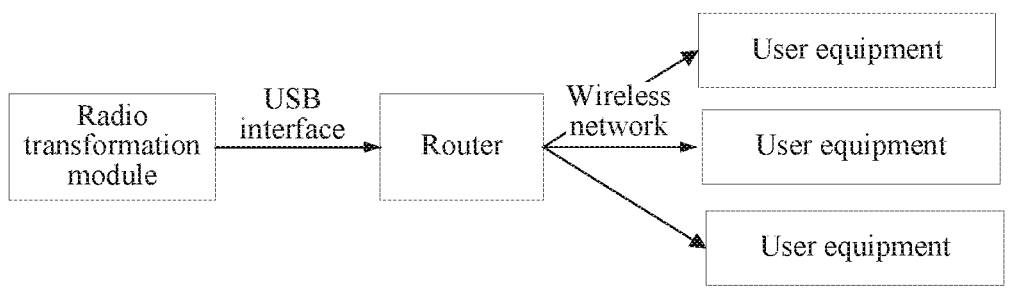
FIG. 1 is a schematic diagram of a radio signal processing system according to an embodiment of the disclosure.
Figure 2:
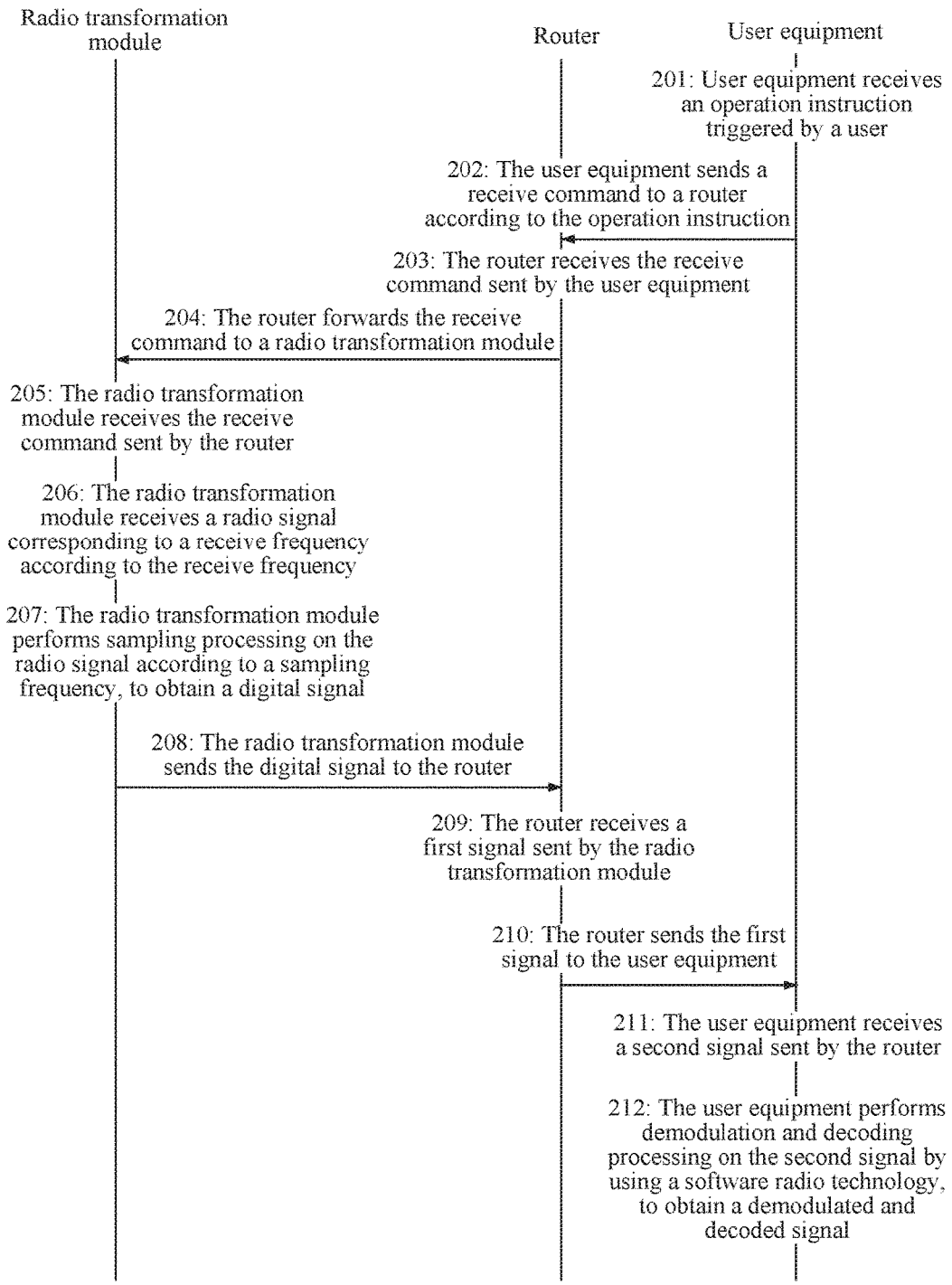
FIG. 2 is a flowchart of a radio signal processing system according to an embodiment of the disclosure.

An embodiment of the disclosure provides a radio signal processing system. The radio signal processing system includes a radio transformation module, a router, and multiple user equipment, as shown in FIG. 1. Information is transmitted between the radio transformation module and the router by using a USB interface, and information is transmitted between the router and at least one user equipment by using the Ethernet or wireless Fidelity® (WI-FI). Therefore, radio signal processing complexity can be greatly reduced. As shown in FIG. 2, the system includes the following steps.

Step 201: User equipment receives an operation instruction triggered by a user.

Step 202: The user equipment sends a receive command to the router according to the operation instruction.

The receive command carries a radio frequency parameter, and the radio frequency parameter includes a receive frequency and a sampling frequency.

For this embodiment of the disclosure, the user equipment may be a user terminal, which may be a mobile phone, an intelligent terminal, a multimedia device, a streaming media device, and the like.

Step 203: The router receives the receive command sent by the user equipment.

For this embodiment of the disclosure, the router is a device that connects local area networks and wide area networks that are on the Internet, and the router automatically selects and sets a route according to a channel status, so as to send signals along an optimal path in sequential order.

Step 204: The router forwards the receive command to a radio transformation module.

Step 205: The radio transformation module receives the receive command sent by the router.

For this embodiment of the disclosure, the radio transformation module is an interface module, and may be configured to receive the receive command sent by the router. In this embodiment of the disclosure, the receive command is used to control the radio transformation module to receive a radio frequency signal that conforms to the receive command.

For this embodiment of the disclosure, the radio transformation module only receives a radio signal and performs sampling processing on the received radio signal, and does not perform any standard-related operation such as demodulation or protocol processing.

Figure 3:
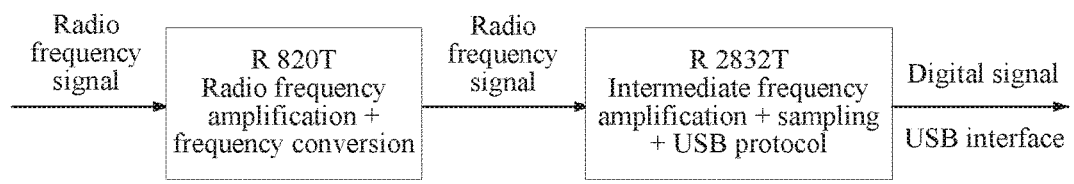
FIG. 3 is a structural diagram of a circuit of a radio transformation module according to an embodiment of the disclosure.

For this embodiment of the disclosure, the radio transformation module may include two chips, such as chips RTL2832U and R820T. The chip RTL2832U is a control and analog-to-digital conversion chip, and the chip R820T is a radio frequency analog signal processing chip, as shown in FIG. 3.

Step 206: The radio transformation module receives a radio signal corresponding to a receive frequency according to the receive frequency.

For this embodiment of the disclosure, the radio signal carries information used by the user equipment. In this embodiment of the disclosure, the radio signal may be a radio frequency signal. The radio frequency signal is a wave that has been modulated and that has a particular transmit frequency.

Step 207: The radio transformation module performs sampling processing on the radio signal according to a sampling frequency, to obtain a digital signal.

For this embodiment of the disclosure, the digital signal refers to a signal whose independent variable is discrete and whose dependent variable is also discrete. For such a signal, an independent variable is represented by using an integer, and a dependent variable is represented by using one number of finite numbers.

Step 208: The radio transformation module sends the digital signal to the router.

For this embodiment of the disclosure, the router is a device that connects local area networks and wide area networks that are on the Internet, and the router automatically selects and sets a route according to a channel status, so as to send signals along an optimal path in sequential order.

For this embodiment of the disclosure, information is exchanged between the radio transformation module and the router by using an interface, and therefore the radio transformation module encapsulates the digital signal and sends the encapsulated digital signal to the router. Information may be exchanged between the radio transformation module and the router by using the USB interface.

Step 209: The router receives a first signal sent by the radio transformation module.

The first signal is a signal that is obtained after the radio transformation module receives the radio signal according to the receive frequency and samples the radio signal according to the sampling frequency.

For this embodiment of the disclosure, the radio transformation module receives a radio signal according to a receive frequency, then performs sampling processing on the received radio signal according to a sampling frequency, and sends the radio signal on which the sampling processing has been performed to the router.

Step 210: The router sends the first signal to the user equipment.

For this embodiment of the disclosure, a main function of the router is a signal forwarding function. The router may send a digital signal to multiple user equipment, so that the multiple user equipment process the digital signal.

Step 211: The user equipment receives a second signal sent by the router.

The second signal is a signal that is obtained after the router forwards the first signal.

For this embodiment of the disclosure, the radio signal received by the user equipment is the radio signal sent by the router, and therefore the radio signal is a digital signal. In this embodiment of the disclosure, the digital signal carries information used by the user equipment. However, when processing such as demodulation or decoding is not performed on the digital signal, the user equipment cannot output the information that is used by the user equipment and that is carried in the digital signal.

Step 212: The user equipment performs demodulation and decoding processing on the second signal by using a software radio technology, to obtain a demodulated and decoded signal.

For this embodiment of the disclosure, the user equipment processes the radio signal in a software form. In this embodiment of the disclosure, the user equipment may successively perform network protocol encapsulated packet parsing processing, signal demodulation and error correction processing, decoding processing, format conversion processing, and data usage processing on the received radio signal. In this embodiment of the disclosure, multiple types of software may be configured for the user equipment, and more functions are implemented by changing software that exists in the user equipment.

By means of the radio signal processing system provided in this embodiment of the disclosure, the radio transformation module first receives a receive command that is sent by the router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using the radio signal receiving module, in this embodiment of the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

By means of the radio signal processing system provided in this embodiment of the disclosure, the router first receives a receive command that is sent by the user equipment and that carries a receive frequency and a sampling frequency, and forwards the receive command to the radio transformation module; then the router receives a signal that is obtained after the radio transformation module receives the radio signal according to the receive frequency and samples a signal for sampling according to the sampling frequency; and finally the router sends a sampled signal to the user equipment. Compared with that currently a radio signal is received and processed by using the radio signal receiving module, in this embodiment of the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

By means of the radio signal processing system provided in this embodiment of the disclosure, the user equipment first sends a receive command that carries a receive frequency and a sampling frequency to the router; then receives a signal that is obtained after the radio transformation module samples, according to the sampling frequency, a radio signal that is sent by the router and that is received by the radio transformation module according to the receive frequency; and finally performs demodulation and decoding processing on a digital signal by using a software radio technology, to obtain a demodulated and decoded signal. Compared with that currently a radio signal is received and processed by using a radio signal receiving module, in this embodiment of the disclosure, the user equipment sends a receive command that carries a receive frequency and a sampling frequency to the router, so that the router can forward the receive command to the radio transformation module, and the radio transformation module receives and processes a radio signal according to the receive frequency and the sampling frequency, that is, by sending the receive command that carries the receive frequency and the sampling frequency to the router, the user equipment obtains the radio signal, without having to change different receiving and processing modules. Therefore, radio signal processing complexity can be greatly reduced.

Figure 4:
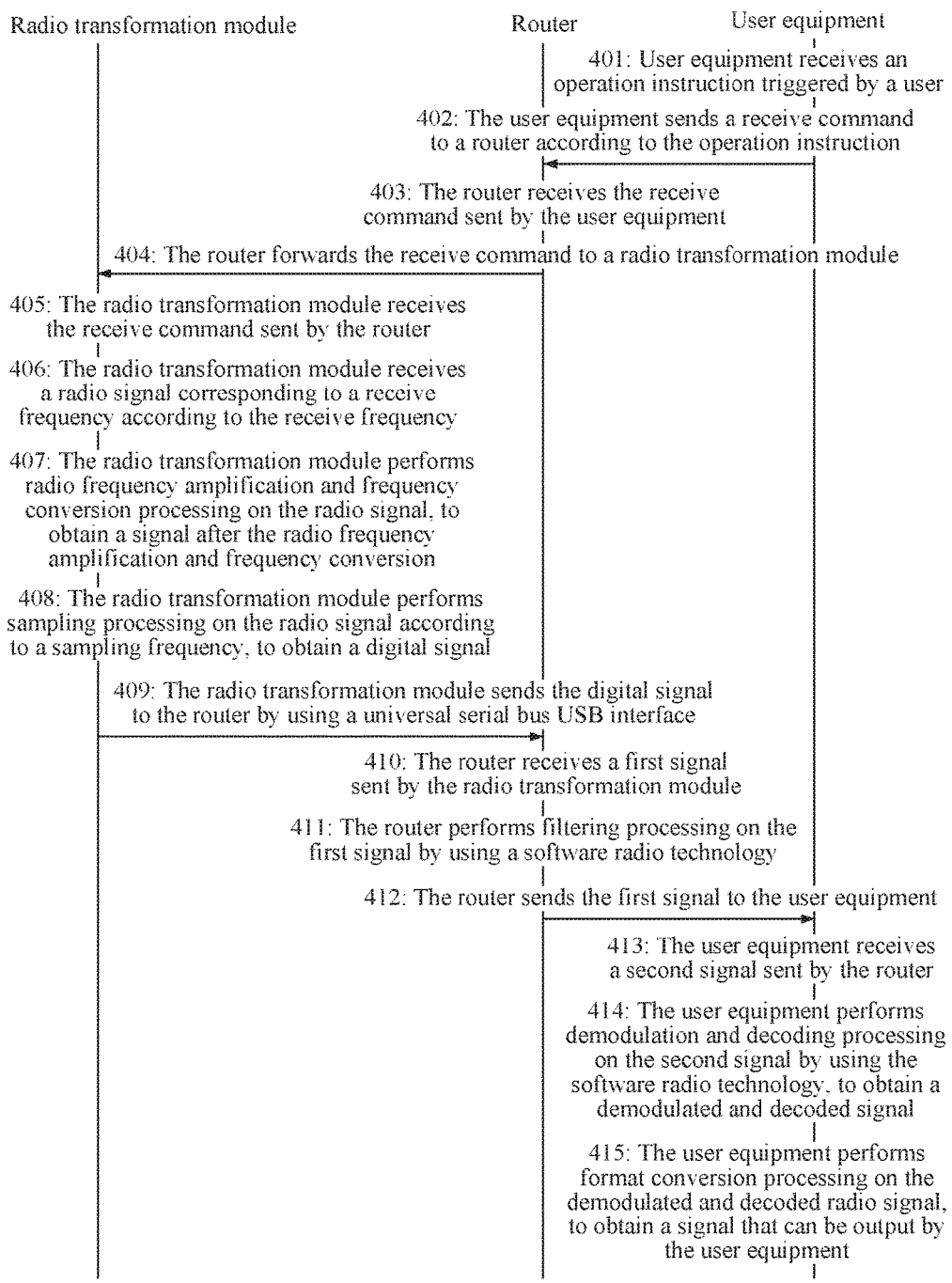
FIG. 4 is a flowchart of another radio signal processing system according to an embodiment of the disclosure.

As specific description about the method shown in FIG. 2, an embodiment of the disclosure provides another radio signal processing system. As shown in FIG. 4, the system includes the following steps.

Step 401: User equipment receives an operation instruction triggered by a user.

Step 402: The user equipment sends a receive command to a router according to the operation instruction.

The receive command carries a radio frequency parameter, and the radio frequency parameter includes a receive frequency and a sampling frequency.

For this embodiment of the disclosure, the user equipment may be a user terminal, which may be a mobile phone, an intelligent terminal, a multimedia device, a streaming media device, and the like.

Step 403: The router receives the receive command sent by the user equipment.

For this embodiment of the disclosure, the router is a device that connects local area networks and wide area networks that are on the Internet, and the router automatically selects and sets a route according to a channel status, so as to send signals along an optimal path in sequential order.

Step 404: The router forwards the receive command to a radio transformation module.

Step 405: The radio transformation module receives the receive command sent by the router.

For this embodiment of the disclosure, the radio transformation module is an interface module, and may be configured to receive the receive command sent by the router.

Step 406: The radio transformation module receives a radio signal corresponding to a receive frequency according to the receive frequency.

For this embodiment of the disclosure, by using a receive frequency, the radio transformation module can receive a radio signal corresponding to the receive frequency, so that the radio transformation module may receive different radio signals according to different receive frequencies, without having to use different receiving modules to receive different radio signals, and then radio signal receiving complexity can be reduced.

Step 407: The radio transformation module performs radio frequency amplification and frequency conversion processing on the radio signal, to obtain a signal after the radio frequency amplification and frequency conversion.

For this embodiment of the disclosure, the radio transformation module first performs radio frequency amplification processing on a received radio signal, to obtain a radio signal after the radio frequency amplification, and then performs frequency conversion processing on the radio signal after the radio frequency amplification, to obtain a radio signal after the frequency conversion.

For this embodiment of the disclosure, when a radio frequency signal is amplified according to a radio frequency, a radio signal cannot be amplified excessively. Therefore, the radio frequency signal is converted into an intermediate frequency signal, to implement further amplification processing on the radio signal.

Step 408: The radio transformation module performs sampling processing on the radio signal according to a sampling frequency, to obtain a digital signal.

For this embodiment of the disclosure, by using a sampling frequency carried in a received receive command, the radio transformation module can perform sampling processing on a radio signal, so that the radio transformation module may perform sampling according to different radio signals, to obtain different radio signals, without having to use different modules to obtain different sampled signals, and then radio signal processing complexity can be further reduced.

Step 409: The radio transformation module sends the digital signal to the router by using a USB interface.

For this embodiment of the disclosure, the USB interface is an external bus standard, is used to regulate connection and communication between a computer and an external device, and is an interface technology applied to the field of personal computers.

Figure 5:
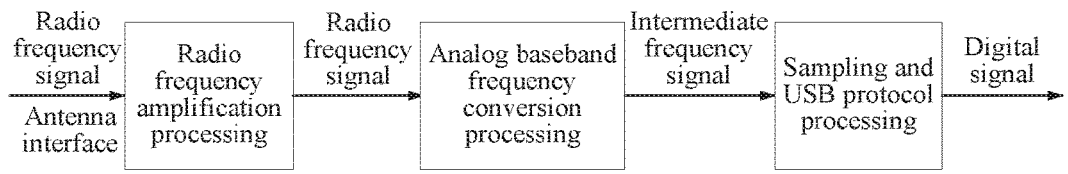
FIG. 5 is a flowchart of processing, by a radio transformation module, a radio signal according to an embodiment of the disclosure.

For this embodiment of the disclosure, the radio transformation module first performs radio frequency amplification processing on a received signal; then performs frequency conversion and amplification processing on a radio signal after the radio frequency amplification, to obtain an intermediate frequency signal; and finally performs sampling processing on the intermediate frequency signal and performs USB protocol encapsulation on a signal obtained after the sampling processing, to obtain a USB protocol encapsulated packet, as shown in FIG. 5.

For this embodiment of the disclosure, a transmit circuit may be added to the radio transformation module, so that the radio transformation module may transmit a radio signal. For example, the radio transformation module may be used as a communications module, which has a role that is the same as that of a two-way data transmission device or a data card, where the two-way data transmission device or the data card may transmit a signal to another device.

Step 410: The router receives a first signal sent by the radio transformation module.

The first signal is a signal that is obtained after the radio transformation module receives the radio signal according to the receive frequency and samples the radio signal according to the sampling frequency.

For this embodiment of the disclosure, the radio transformation module receives a radio signal according to a receive frequency, then performs sampling processing on the received radio signal according to a sampling frequency, and sends the radio signal on which the sampling processing has been performed to the router.

Step 411: The router performs filtering processing on the first signal by using a software radio technology.

For this embodiment of the disclosure, software defined radio (SDR) is a radio communications technology, and is implemented based on a software defined digital signal processing technology but not a hardware component. That is, a frequency band, an interface protocol, and a function may be upgraded by means of software download and update, without completely changing hardware.

For this embodiment of the disclosure, the router may perform filtering processing on a digital signal in aspects of time and frequency, so that bandwidth utilized by the digital signal can be reduced. In this embodiment of the disclosure, by reducing network bandwidth used by a sampled signal, the router can transmit an intermediate frequency digital signal to the user equipment by using relatively small bandwidth, so that a time used to transmit the signal is reduced, and then user experience can be improved.

For this embodiment of the disclosure, by using the software radio technology, the router can perform filtering processing on a digital signal, so that when a function of the router is to be upgraded, only software is to be upgraded, without a having to change hardware. Therefore, costs can be reduced, and the hardware can be simplified.

Step 412: The router sends the first signal to the user equipment.

For this embodiment of the disclosure, the router sends a digital signal to the user equipment by using a wireless network. In this embodiment of the disclosure, the wireless network may be the Ethernet or WI-FI.

Figure 6:
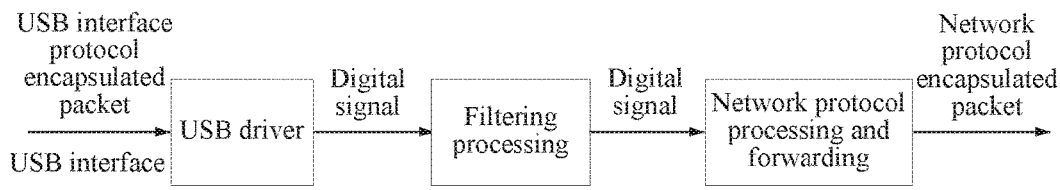
FIG. 6 is a flowchart of processing, by a router, a radio signal according to an embodiment of the disclosure.

For this embodiment of the disclosure, the router first receives a digital signal; then performs filtering processing on the digital signal, and encapsulates the processed signal by using a network protocol, to obtain a network protocol encapsulated packet; and finally forwards the network protocol encapsulated packet to the user equipment, as shown in FIG. 6.

For this embodiment of the disclosure, when the router sends a digital signal to the user equipment, an error occurs in the user equipment during information transmission, that is, phenomena such as a packet loss and an error packet occur in the digital signal during the information transmission, and the router may re-transmit a lost digital signal or a digital signal in which an error occurs during the transmission.

For this embodiment of the disclosure, on a network, by means of detection of whether phenomena such as a packet loss and an error packet occur in an encapsulated packet corresponding to a sampled signal, when an error occurs in network signal transmission, the router may re-transmit a lost digital signal or a digital signal in which an error occurs during the transmission, so that the user equipment can receive a complete digital signal, and radio signal receiving accuracy can be increased.

Step 413: The user equipment receives a second signal sent by the router.

The second signal is a signal that is obtained after the router forwards the first signal.

The second signal may be further a radio signal that is obtained after the router filters and forwards the first signal by using the software radio technology.

For this embodiment of the disclosure, the radio signal received by the user equipment is the radio signal sent by the router, and therefore the radio signal is a digital signal. In this embodiment of the disclosure, the digital signal carries information used by the user equipment. However, when processing such as demodulation or decoding is not performed on the digital signal, the user equipment cannot output the information that is used by the user equipment and that is carried in the digital signal.

Step 414: The user equipment performs demodulation and decoding processing on the second signal by using the software radio technology, to obtain a demodulated and decoded signal.

For this embodiment of the disclosure, the user equipment processes the radio signal in a software form. In this embodiment of the disclosure, the user equipment may successively perform network protocol encapsulated packet parsing processing, signal demodulation and error correction processing, decoding processing, format conversion processing, and data usage processing on the received radio signal. In this embodiment of the disclosure, multiple types of software may be configured for the user equipment, and more functions are implemented by changing software that exists in the user equipment.

Step 415: The user equipment performs format conversion processing on the demodulated and decoded radio signal, to obtain a signal that can be output by the user equipment.

For this embodiment of the disclosure, the user equipment may convert decoded information into an audio format or a video format according to a standard format or a format of a content provider, so that the user equipment can output the decoded information.

For this embodiment of the disclosure, in the user equipment, a received radio signal is processed by using software, and therefore the user equipment may change different software, to implement different functions. In this embodiment of the disclosure, by changing different software, the user equipment can perform, according to the different software, processing such as demodulation, decoding, and format conversion on information received by the user equipment, that is, on the premise of not changing hardware, multiple functions are implemented by upgrading software, so that costs can be reduced, and user experience can be improved.

Figure 7:
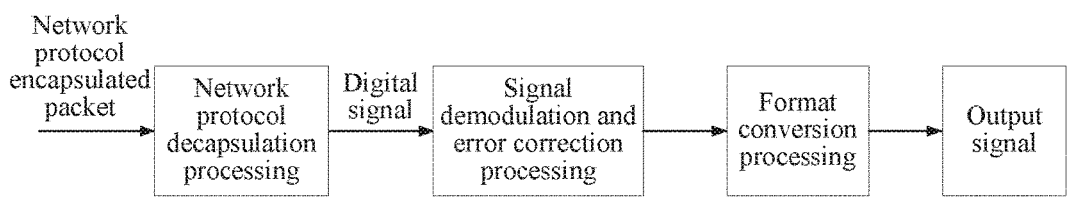
FIG. 7 is a flowchart of processing, by user equipment, a radio signal according to an embodiment of the disclosure.

For this embodiment of the disclosure, the user equipment first receives a network protocol encapsulated packet, then performs decapsulation processing, signal demodulation and error correction processing, decoding processing, and format conversion processing on the network protocol encapsulated packet, and finally outputs information on which the format conversion has been performed, as shown in FIG. 7.

By means of the radio signal processing system provided in this embodiment of the disclosure, the radio transformation module first receives a receive command that is sent by the router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using the radio signal receiving module, in this embodiment of the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

By means of the radio signal processing system provided in this embodiment of the disclosure, the router first receives a receive command that is sent by the user equipment and that carries a receive frequency and a sampling frequency, and forwards the receive command to the radio transformation module; then the router receives a signal that is obtained after the radio transformation module receives the radio signal according to the receive frequency and samples a signal for sampling according to the sampling frequency; and finally the router sends a sampled signal to the user equipment. Compared with that currently a radio signal is received and processed by using the radio signal receiving module, in this embodiment of the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

By means of the radio signal processing system provided in this embodiment of the disclosure, the user equipment first sends a receive command that carries a receive frequency and a sampling frequency to the router; then receives a signal that is obtained after the radio transformation module samples, according to the sampling frequency, a radio signal that is sent by the router and that is received by the radio transformation module according to the receive frequency; and finally performs demodulation and decoding processing on a digital signal by using a software radio technology, to obtain a demodulated and decoded signal. Compared with that currently a radio signal is received and processed by using a radio signal receiving module, in this embodiment of the disclosure, the user equipment sends a receive command that carries a receive frequency and a sampling frequency to the router, so that the router can forward the receive command to the radio transformation module, and the radio transformation module receives and processes a radio signal according to the receive frequency and the sampling frequency, that is, by sending the receive command that carries the receive frequency and the sampling frequency to the router, the user equipment obtains the radio signal, without having to change different receiving and processing modules. Therefore, radio signal processing complexity can be greatly reduced.

Further, by means of the radio signal processing system provided in this embodiment of the disclosure, by using a receive frequency, the radio transformation module can receive a radio signal corresponding to the receive frequency, so that the radio transformation module may receive different radio signals according to different receive frequencies, without having to use different receiving modules to receive different radio signals, and then radio signal receiving complexity can be reduced. By using a sampling frequency carried in a received receive command, the radio transformation module can perform sampling processing on the radio signal, so that the radio transformation module may perform sampling according to different radio signals, to obtain different radio signals, without having to use different modules to obtain different sampled signals, and then radio signal processing complexity can be further reduced.

Further, by means of the radio signal processing system provided in this embodiment of the disclosure, the router may perform filtering processing on a digital signal in aspects of time and frequency, so that bandwidth used by the digital signal can be reduced. In this embodiment of the disclosure, by reducing network bandwidth used by a digital signal, the router can transmit the digital signal to the user equipment by using relatively small bandwidth, so that a time to transmit the signal is reduced, and then user experience can be improved. By using the software radio technology, the router can perform filtering processing on a digital signal, so that when a function of the router is to be upgraded, only software is to be upgraded, without having to change hardware. Therefore, costs can be reduced, and the hardware can be simplified. On a network, by means of detection of whether phenomena such as a packet loss and an error packet occur in an encapsulated packet corresponding to a sampled signal, when an error occurs in network signal transmission, the router may re-transmit a lost digital signal or a digital signal in which an error occurs during the transmission, so that the user equipment can receive a complete digital signal, and radio signal receiving accuracy can be increased.

Further, by means of the radio signal processing system provided in this embodiment of the disclosure, by sending a receive command to the radio transformation module according to a demodulation result, the user equipment can enable the radio transformation module to adjust, according to the receive command, parameter information such as a frequency and a gain for radio signal receiving and processing, so that accuracy of receiving, by the radio transformation module, a radio signal can be increased. By changing different software, the user equipment can perform, according to the different software, processing such as demodulation, decoding, and format conversion on information received by the user equipment, that is, on the premise of not changing hardware, multiple functions are implemented by upgrading software, so that costs can be reduced, and user experience can be improved.

Figure 8:
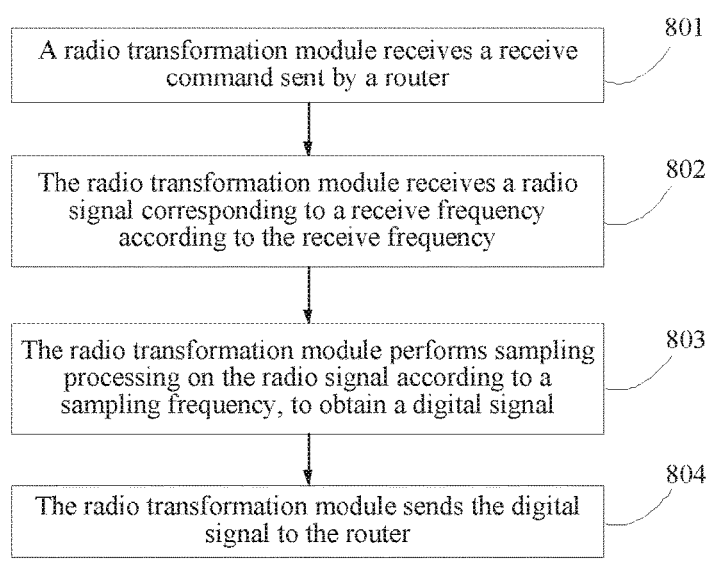
FIG. 8 is a flowchart of a radio signal processing method according to an embodiment of the disclosure.

Further, as an implementation of the systems shown in FIG. 2 and FIG. 4, an embodiment of the disclosure further provides a radio signal processing method, to reduce radio signal processing complexity. As shown in FIG. 8, the method includes the following steps.

Step 801: A radio transformation module receives a receive command sent by a router.

The receive command carries radio frequency parameter information, and the radio frequency parameter information includes a receive frequency and a sampling frequency.

For this embodiment of the disclosure, the radio transformation module is an interface module, and may be configured to receive the receive command sent by the router. In this embodiment of the disclosure, the receive command is used to control the radio transformation module to receive a radio frequency signal that conforms to the receive command.

For this embodiment of the disclosure, the radio transformation module only receives a radio signal and performs sampling processing on the received radio signal, and does not perform any standard-related operation such as demodulation or protocol processing.

For this embodiment of the disclosure, the radio transformation module may include two chips, such as chips RTL2832U and R820T from REALTEK®. (REALTEK is a registered trademark of Realtek Semiconductor Corp.). The chip RTL2832U is a control and analog-to-digital conversion chip, and the chip R820T is a radio frequency analog signal processing chip.

Step 802: The radio transformation module receives a radio signal corresponding to a receive frequency according to the receive frequency.

For this embodiment of the disclosure, the radio signal carries information used by the user equipment. In this embodiment of the disclosure, the radio signal may be a radio frequency signal. The radio frequency signal is a wave that has been modulated and that has a particular transmit frequency.

For this embodiment of the disclosure, the radio transformation module can receive different radio signals according to different receive frequencies. In this embodiment of the disclosure, the receive frequency is essentially a signal receiving frequency band, that is, the radio transformation module can receive a radio signal only in the frequency band. For example, if the receive frequency is from 100 megahertz (MHz) to 105 MHz, the radio transformation module receives a radio signal of 100 MHz to 105 MHz.

Step 803: The radio transformation module performs sampling processing on the radio signal according to a sampling frequency, to obtain a digital signal.

For this embodiment of the disclosure, the radio transformation module performs sampling processing on a received radio signal according to a sampling frequency, to obtain a digital signal that conforms to the sampling frequency. For example, if the sampling frequency is 8 kilohertz (kHz), a frequency of the digital signal is 8 kHz, that is, the digital signal is a signal at a phone voice level.

Step 804: The radio transformation module sends the digital signal to the router.

For this embodiment of the disclosure, the router is a device that connects local area networks and wide area networks that are on the Internet, and the router automatically selects and sets a route according to a channel status, so as to send signals along an optimal path in sequential order.

For this embodiment of the disclosure, information is exchanged between the radio transformation module and the router by using an interface, and therefore the radio transformation module encapsulates the digital signal and sends the encapsulated digital signal to the router. Information may be exchanged between the radio transformation module and the router by using the USB interface.

By means of the radio signal processing method provided in this embodiment of the disclosure, a radio transformation module first receives a receive command that is sent by a router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using the radio signal receiving module, in this embodiment of the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

Figure 9:
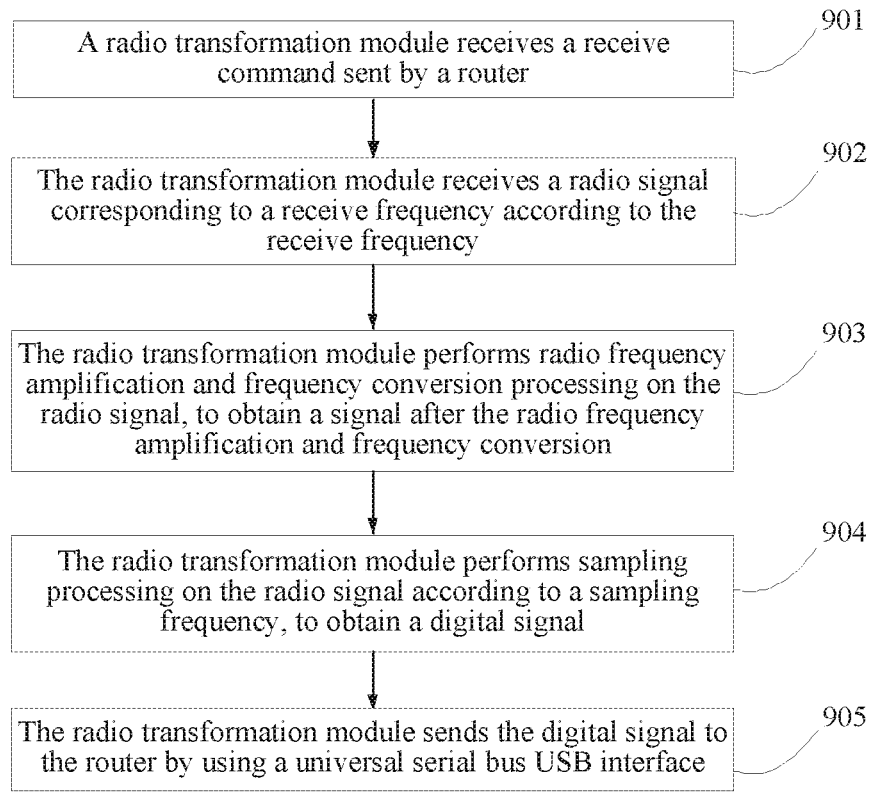
FIG. 9 is a flowchart of another radio signal processing method according to an embodiment of the disclosure.

As specific description about the method shown in FIG. 8, an embodiment of the disclosure provides another radio signal processing method. As shown in FIG. 9, the method includes the following steps.

Step 901: A radio transformation module receives a receive command sent by a router.

The receive command carries radio frequency parameter information, and the radio frequency parameter information includes a receive frequency and a sampling frequency.

For this embodiment of the disclosure, the radio transformation module is an interface module, and may be configured to receive the receive command sent by the router.

Step 902: The radio transformation module receives a radio signal corresponding to a receive frequency according to the receive frequency.

For this embodiment of the disclosure, by using a receive frequency, the radio transformation module can receive a radio signal corresponding to the receive frequency, so that the radio transformation module may receive different radio signals according to different receive frequencies, without having to use different receiving modules to receive different radio signals, and then radio signal receiving complexity can be reduced.

Step 903: The radio transformation module performs radio frequency amplification and frequency conversion processing on the radio signal, to obtain a signal after the radio frequency amplification and frequency conversion.

For this embodiment of the disclosure, the radio transformation module first performs radio frequency amplification processing on a received radio signal, to obtain a radio signal after the radio frequency amplification, and then performs frequency conversion processing on the radio signal after the radio frequency amplification, to obtain a radio signal after the frequency conversion.

For this embodiment of the disclosure, when a radio frequency signal is amplified according to a radio frequency, a radio signal cannot be amplified excessively. Therefore, the radio frequency signal is to be converted into an intermediate frequency signal, to implement further amplification processing on the radio signal.

Step 904: The radio transformation module performs sampling processing on the radio signal according to a sampling frequency, to obtain a digital signal.

For this embodiment of the disclosure, by using a sampling frequency carried in a received receive command, the radio transformation module can perform sampling processing on a radio signal, so that the radio transformation module may perform sampling according to different radio signals, to obtain different radio signals, without having to use different modules to obtain different sampled signals, and then radio signal processing complexity can be further reduced.

Step 905: The radio transformation module sends the digital signal to the router by using a USB interface.

For this embodiment of the disclosure, the USB interface is an external bus standard, is used to regulate connection and communication between a computer and an external device, and is an interface technology applied to the field of personal computers.

For this embodiment of the disclosure, the radio transformation module first performs radio frequency amplification processing on a received signal; then performs frequency conversion and amplification processing on a radio signal after the radio frequency amplification, to obtain an intermediate frequency signal; and finally performs sampling processing on the intermediate frequency signal and performs USB protocol encapsulation on a signal obtained after the sampling processing, to obtain a USB protocol encapsulated packet.

For this embodiment of the disclosure, a transmit circuit may be added to the radio transformation module, so that the radio transformation module may transmit a radio signal. For example, the radio transformation module may be used as a communications module, which has a role that is the same as that of a two-way data transmission device or a data card, where the two-way data transmission device or the data card may transmit a signal to another device.

By means of the radio signal processing method provided in this embodiment of the disclosure, a radio transformation module first receives a receive command that is sent by a router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using the radio signal receiving module, in this embodiment of the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

Further, by means of the radio signal processing method provided in this embodiment of the disclosure, by using a receive frequency, the radio transformation module can receive a radio signal corresponding to the receive frequency, so that the radio transformation module may receive different radio signals according to different receive frequencies, without having to use different receiving modules to receive different radio signals, and then radio signal receiving complexity can be reduced. By using a sampling frequency carried in a received receive command, the radio transformation module can perform sampling processing on the radio signal, so that the radio transformation module may perform sampling according to different radio signals, to obtain different radio signals, without having to use different modules to obtain different sampled signals, and then radio signal processing complexity can be further reduced.

Figure 10:
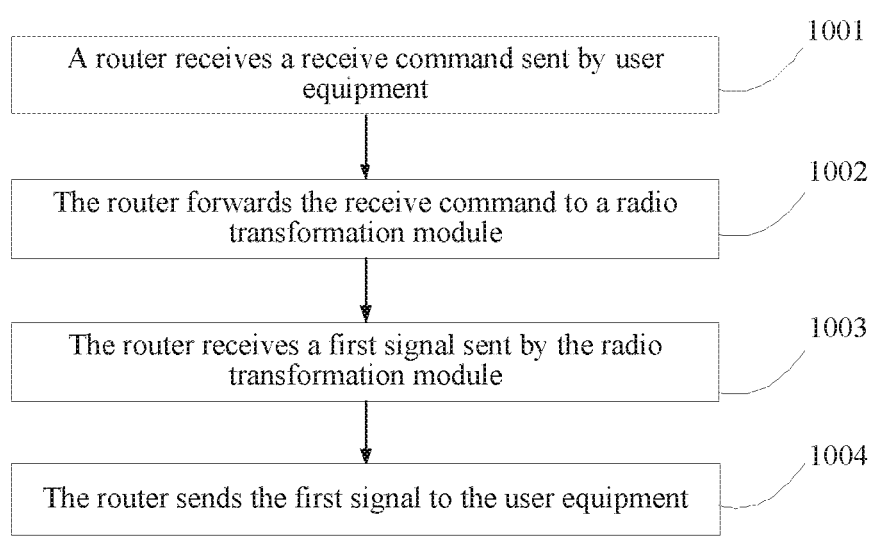
FIG. 10 is a flowchart of still another radio signal processing method according to an embodiment of the disclosure.

An embodiment of the disclosure provides still another radio signal processing method, so as to greatly reduce radio signal processing complexity. As shown in FIG. 10, the method includes the following steps.

Step 1001: A router receives a receive command sent by user equipment.

The receive command carries radio frequency parameter information, and the radio frequency parameter information includes a receive frequency and a sampling frequency.

For this embodiment of the disclosure, the router is a device that connects local area networks and wide area networks that are on the Internet, and the router automatically selects and sets a route according to a channel status, so as to send signals along an optimal path in sequential order.

Step 1002: The router forwards the receive command to a radio transformation module.

Step 1003: The router receives a first signal sent by the radio transformation module.

The first signal is a signal that is obtained after the radio transformation module receives a radio signal according to the receive frequency and samples the radio signal according to the sampling frequency.

For this embodiment of the disclosure, the radio transformation module receives a radio signal according to a receive frequency, then performs sampling processing on the received radio signal according to a sampling frequency, and sends the radio signal on which the sampling processing has been performed to the router.

Step 1004: The router sends the first signal to the user equipment.

For this embodiment of the disclosure, a main function of the router is a signal forwarding function. The router may send a digital signal to multiple user equipment, so that the multiple user equipment process the digital signal.

By means of the radio signal processing method provided in this embodiment of the disclosure, a router first receives a receive command that is sent by user equipment and that carries a receive frequency and a sampling frequency, and forwards the receive command to a radio transformation module; then the router receives a signal that is obtained after the radio transformation module receives a radio signal according to the receive frequency and samples a signal for sampling according to the sampling frequency; and finally the router sends a sampled signal to the user equipment. Compared with that currently a radio signal is received and processed by using the radio signal receiving module, in this embodiment of the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

Figure 11:
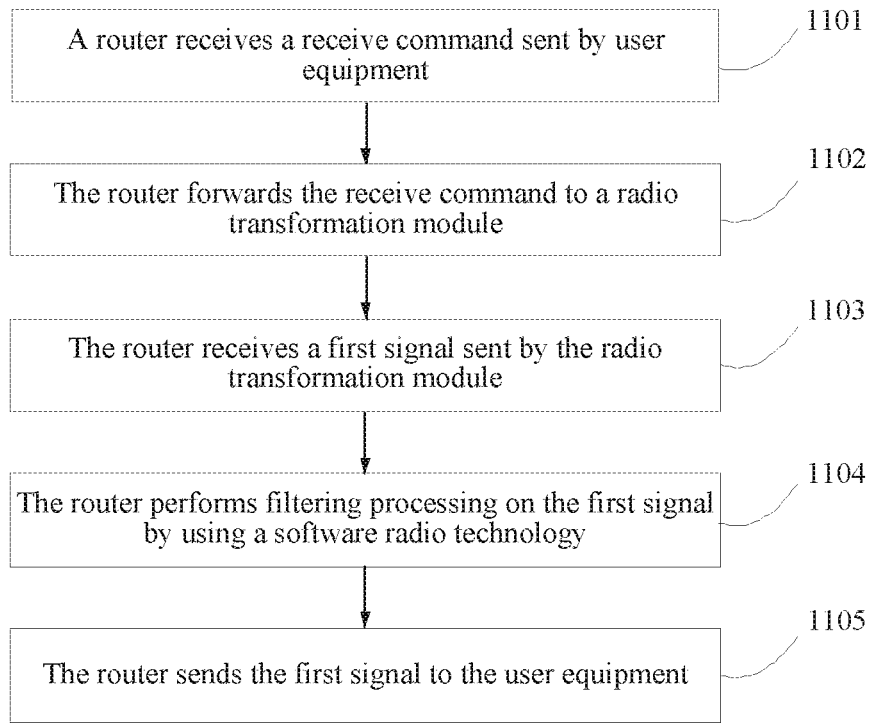
FIG. 11 is a flowchart of yet another radio signal processing method according to an embodiment of the disclosure.

As specific description about the method shown in FIG. 10, an embodiment of the disclosure provides yet another radio signal processing method. As shown in FIG. 11, the method includes the following steps.

Step 1101: A router receives a receive command sent by user equipment.

The receive command carries radio frequency parameter information, and the radio frequency parameter information includes a receive frequency and a sampling frequency.

For this embodiment of the disclosure, the router is a device that connects local area networks and wide area networks that are on the Internet, and the router automatically selects and sets a route according to a channel status, so as to send signals along an optimal path in sequential order.

Step 1102: The router forwards the receive command to a radio transformation module.

Step 1103: The router receives a first signal sent by the radio transformation module.

The first signal is a signal that is obtained after the radio transformation module receives a radio signal according to the receive frequency and samples a signal for sampling according to the sampling frequency.

For this embodiment of the disclosure, SDR is a radio communications technology, and is implemented based on a software defined digital signal processing technology but not a hardware component. That is, a frequency band, an interface protocol, and a function may be upgraded by means of software download and update, without having to completely change hardware.

Step 1104: The router performs filtering processing on the first signal by using a software radio technology.

For this embodiment of the disclosure, SDR is a radio communications technology, and is implemented based on a software defined digital signal processing technology but not a hardware component. That is, a frequency band, an interface protocol, and a function may be upgraded by means of software download and update, without having to completely change hardware.

For this embodiment of the disclosure, the router may perform filtering processing on a digital signal in aspects of time and frequency, so that bandwidth utilized by the digital signal can be reduced. In this embodiment of the disclosure, by reducing network bandwidth utilized by a sampled signal, the router can transmit an intermediate frequency digital signal to the user equipment by using relatively small bandwidth, so that a time used to transmit the signal is reduced, and then user experience can be improved.

For this embodiment of the disclosure, by using the software radio technology, the router can perform filtering processing on a digital signal, so that when a function of the router is to be upgraded, only software is to be upgraded, without having to change hardware. Therefore, costs can be reduced, and the hardware can be simplified.

Step 1105: The router sends the first signal to the user equipment.

For this embodiment of the disclosure, the router sends a digital signal to the user equipment by using a wireless network. In this embodiment of the disclosure, the wireless network may be the Ethernet or WI-FI.

For this embodiment of the disclosure, the router first receives a digital signal; then performs filtering processing on the digital signal, and encapsulates the processed signal by using a network protocol, to obtain a network protocol encapsulated packet; and finally forwards the network protocol encapsulated packet to the user equipment.

For this embodiment of the disclosure, when the router sends a digital signal to the user equipment, an error occurs in the user equipment during information transmission, that is, phenomena such as a packet loss and an error packet occur in the digital signal during the information transmission, and the router may re-transmit a lost digital signal or a digital signal in which an error occurs during the transmission.

For this embodiment of the disclosure, on a network, by means of detection of whether phenomena such as a packet loss and an error packet occur in an encapsulated packet corresponding to a sampled signal, when an error occurs in network signal transmission, the router may re-transmit a lost digital signal or a digital signal in which an error occurs during the transmission, so that the user equipment can receive a complete digital signal, and radio signal receiving accuracy can be increased.

By means of the radio signal processing method provided in this embodiment of the disclosure, a router first receives a receive command that is sent by user equipment and that carries a receive frequency and a sampling frequency, and forwards the receive command to a radio transformation module; then the router receives a signal that is obtained after the radio transformation module receives a radio signal according to the receive frequency and samples a signal for sampling according to the sampling frequency; and finally the router sends a sampled signal to the user equipment. Compared with that currently a radio signal is received and processed by using the radio signal receiving module, in this embodiment of the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

Further, by means of the radio signal processing method provided in this embodiment of the disclosure, the router may perform filtering processing on a digital signal in aspects of time and frequency, so that bandwidth utilized by the digital signal can be reduced. In this embodiment of the disclosure, by reducing network bandwidth utilized by a digital signal, the router can transmit the digital signal to the user equipment by using relatively small bandwidth, so that a time used to transmit the signal is reduced, and then user experience can be improved. By using the software radio technology, the router can perform filtering processing on a digital signal, so that when a function of the router is to be upgraded, only software is to be upgraded, without having to change hardware. Therefore, costs can be reduced, and the hardware can be simplified. On a network, by means of detection of whether phenomena such as a packet loss and an error packet occur in an encapsulated packet corresponding to a sampled signal, when an error occurs in network signal transmission, the router may re-transmit a lost digital signal or a digital signal in which an error occurs during the transmission, so that the user equipment can receive a complete digital signal, and radio signal receiving accuracy can be increased.

Figure 12:
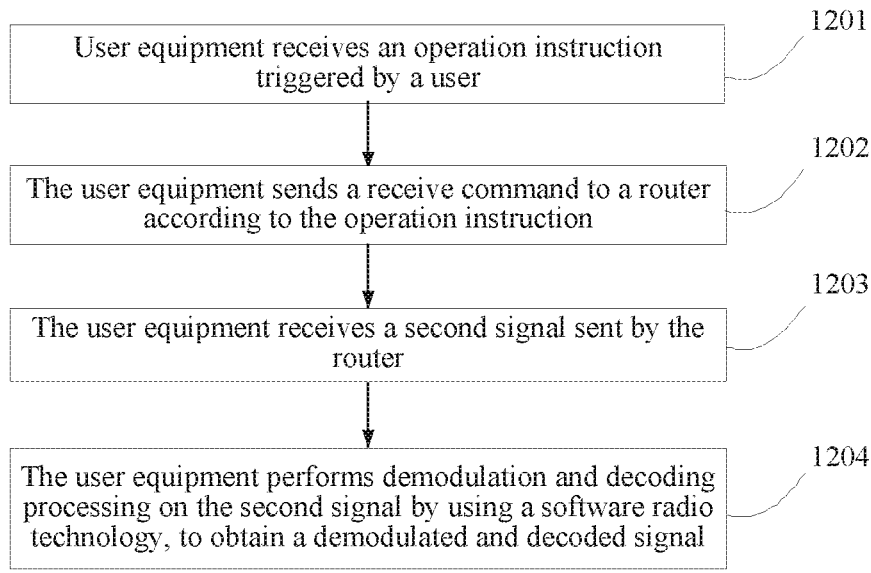
FIG. 12 is a flowchart of still yet another radio signal processing method according to an embodiment of the disclosure.

An embodiment of the disclosure provides still yet another radio signal processing method, so as to greatly reduce radio signal processing complexity. As shown in FIG. 12, the method includes the following steps.

Step 1201: User equipment receives an operation instruction triggered by a user.

Step 1202: The user equipment sends a receive command to a router according to the operation instruction.

The receive command carries radio frequency parameter information, and the radio frequency parameter information includes a receive frequency and a sampling frequency.

For this embodiment of the disclosure, the user equipment may be a user terminal, which may be a mobile phone, an intelligent terminal, a multimedia device, a streaming media device, and the like.

Step 1203: The user equipment receives a second signal sent by the router.

The second signal is a signal that is obtained after the router forwards a first signal, and the first signal is a signal that is obtained after a radio transformation module receives the radio signal according to the receive frequency and the radio transformation module samples the radio signal according to the sampling frequency.

For this embodiment of the disclosure, the radio signal received by the user equipment is the radio signal sent by the router, and therefore the radio signal is a digital signal. In this embodiment of the disclosure, the digital signal carries information utilized by the user equipment. However, when processing such as demodulation or decoding is not performed on the digital signal, the user equipment cannot output the information that is used by the user equipment and that is carried in the digital signal.

Step 1204: The user equipment performs demodulation and decoding processing on the second signal by using a software radio technology, to obtain a demodulated and decoded signal.

For this embodiment of the disclosure, the user equipment processes the radio signal in a software form. In this embodiment of the disclosure, the user equipment may successively perform network protocol encapsulated packet parsing processing, signal demodulation and error correction processing, decoding processing, format conversion processing, and data usage processing on the received radio signal. In this embodiment of the disclosure, multiple types of software may be configured for the user equipment, and more functions are implemented by changing software that exists in the user equipment.

By means of the radio signal processing method provided in this embodiment of the disclosure, user equipment first sends a receive command that carries a receive frequency and a sampling frequency to a router; then receives a signal that is obtained after a radio transformation module samples, according to the sampling frequency, a radio signal that is sent by the router and that is received by the radio transformation module according to the receive frequency; and finally performs demodulation and decoding processing on a digital signal by using a software radio technology, to obtain a demodulated and decoded signal. Compared with that currently a radio signal is received and processed by using a radio signal receiving module, in this embodiment of the disclosure, the user equipment sends a receive command that carries a receive frequency and a sampling frequency to the router, so that the router can forward the receive command to the radio transformation module, and the radio transformation module receives and processes a radio signal according to the receive frequency and the sampling frequency, that is, by sending the receive command that carries the receive frequency and the sampling frequency to the router, the user equipment obtains the utilized radio signal, without having to change different receiving and processing modules. Therefore, radio signal processing complexity can be greatly reduced.

Figure 13:
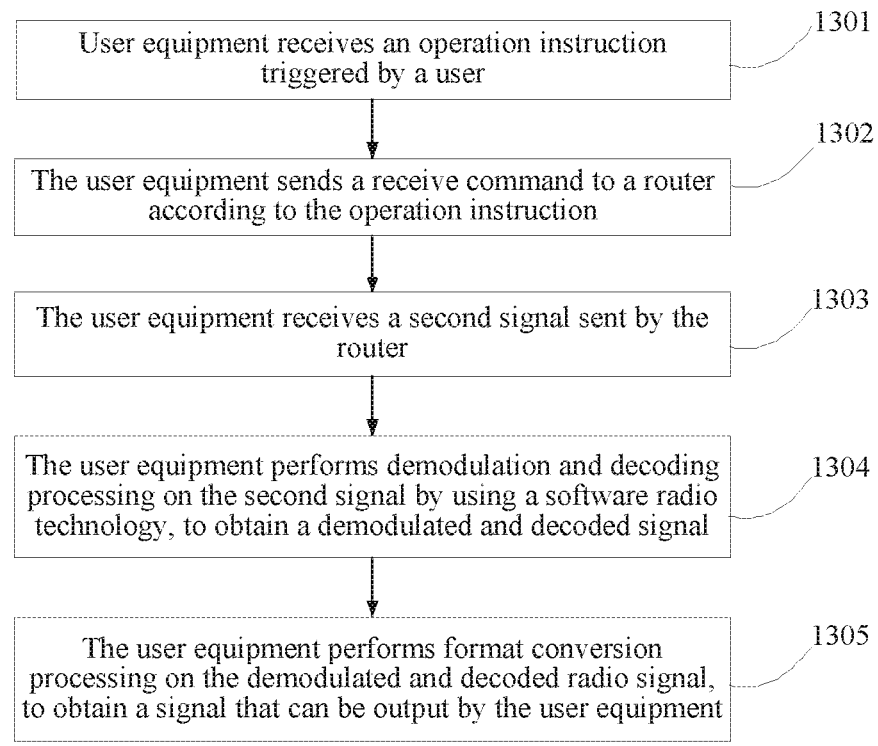
FIG. 13 is a flowchart of still yet further radio signal processing method according to an embodiment of the disclosure.

As specific description about the method shown in FIG. 12, an embodiment of the disclosure provides still yet further radio signal processing method. As shown in FIG. 13, the method includes the following steps.

Step 1301: User equipment receives an operation instruction triggered by a user.

Step 1302: The user equipment sends a receive command to a router according to the operation instruction.

The receive command carries radio frequency parameter information, and the radio frequency parameter information includes a receive frequency and a sampling frequency.

For this embodiment of the disclosure, the user equipment may be a user terminal, which may be a mobile phone, an intelligent terminal, a multimedia device, a streaming media device, and the like.

Step 1303: The user equipment receives a second signal sent by the router.

The second signal is a signal that is obtained after the router forwards a first signal, and the first signal is a signal that is obtained after a radio transformation module receives the radio signal according to the receive frequency and the radio transformation module samples the radio signal according to the sampling frequency.

Optionally, the second signal is a radio signal that is obtained after the router filters and forwards the first signal by using the software radio technology.

Step 1304: The user equipment performs demodulation and decoding processing on the second signal by using a software radio technology, to obtain a demodulated and decoded signal.

For this embodiment of the disclosure, the decoding is a process of using a particular method to restore particular code to content represented by the code, or convert an electrical pulse signal, an optical signal, a radio wave, or the like to information, data, or the like represented by the electrical pulse signal, the optical signal, the radio wave, or the like. The decoding is widely applied to aspects such as a radio technology and communication.

For this embodiment of the disclosure, after the user equipment decodes a demodulated signal, the user equipment groups decoded information into a service data packet again in a grouping manner. For example, the user equipment may group a decoded audio signal, video signal, or the like on a channel into an audio data packet or a video data packet in an audio grouping manner, a video grouping manner, or the like.

For this embodiment of the disclosure, the user equipment may send a receive command to the radio transformation module according to demodulated information, so that the radio transformation module may perform continuous fine tuning on a parameter such as a frequency or a gain for the radio signal according to the receive command. In this embodiment of the disclosure, by sending a receive command to the radio transformation module according to a demodulation result, the user equipment can enable the radio transformation module to adjust, according to the receive command, parameter information such as a frequency and a gain for radio signal receiving and processing, so that accuracy of receiving, by the radio transformation module, a radio signal can be increased.

Step 1305: The user equipment performs format conversion processing on the demodulated and decoded radio signal, to obtain a signal that can be output by the user equipment.

For this embodiment of the disclosure, the user equipment may convert decoded information into an audio format or a video format according to a standard format or a format of a content provider, so that the user equipment can output the decoded information.

For this embodiment of the disclosure, in the user equipment, a received radio signal is processed by using software, and therefore the user equipment may change different software, to implement different functions. In this embodiment of the disclosure, by changing different software, the user equipment can perform, according to the different software, processing such as demodulation, decoding, and format conversion on information received by the user equipment, that is, on the premise of not changing hardware, multiple functions are implemented by upgrading software, so that costs can be reduced, and user experience can be improved.

For this embodiment of the disclosure, the user equipment first receives a network protocol encapsulated packet, then performs decapsulation processing, signal demodulation and error correction processing, decoding processing, and format conversion processing on the network protocol encapsulated packet, and finally outputs information on which the format conversion has been performed.

By means of the radio signal processing method provided in this embodiment of the disclosure, user equipment first sends a receive command that carries a receive frequency and a sampling frequency to a router; then receives a signal that is obtained after a radio transformation module samples, according to the sampling frequency, a radio signal that is sent by the router and that is received by the radio transformation module according to the receive frequency; and finally performs demodulation and decoding processing on a digital signal by using a software radio technology, to obtain a demodulated and decoded signal. Compared with that currently a radio signal is received and processed by using a radio signal receiving module, in this embodiment of the disclosure, the user equipment sends a receive command that carries a receive frequency and a sampling frequency to the router, so that the router can forward the receive command to the radio transformation module, and the radio transformation module receives and processes a radio signal according to the receive frequency and the sampling frequency, that is, by sending the receive command that carries the receive frequency and the sampling frequency to the router, the user equipment obtains the radio signal, without having to change different receiving and processing modules. Therefore, radio signal processing complexity can be greatly reduced.

Further, by means of the radio signal processing method provided in this embodiment of the disclosure, by sending a receive command to the radio transformation module according to a demodulation result, the user equipment can enable the radio transformation module to adjust, according to the receive command, parameter information such as a frequency and a gain for radio signal receiving and processing, so that accuracy of receiving, by the radio transformation module, a radio signal can be increased. By changing different software, the user equipment can perform, according to the different software, processing such as demodulation, decoding, and format conversion on information received by the user equipment, that is, on the premise of not changing hardware, multiple functions are implemented by upgrading software, so that costs can be reduced, and user experience can be improved.

Figure 14:
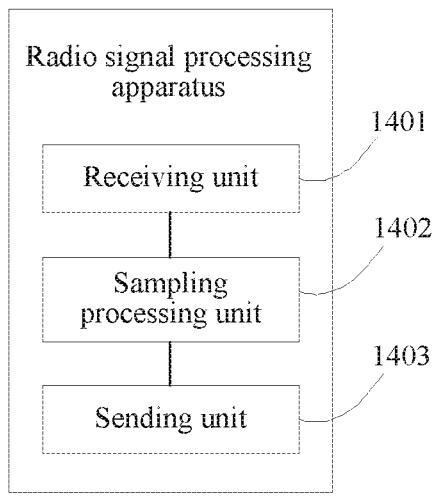
FIG. 14 is a schematic structural diagram of a radio signal processing apparatus according to an embodiment of the disclosure.

Further, as an implementation of the methods shown in FIG. 8 and FIG. 9, an embodiment of the disclosure further provides a radio signal processing apparatus. The apparatus may be located in a radio transformation module, and configured to reduce radio signal processing complexity. As shown in FIG. 14, the apparatus includes a receiving unit 1401, a sampling processing unit 1402, and a sending unit 1403.

The receiving unit 1401 is configured in a radio transformation module to receive a receive command sent by a router.

The receive command carries radio frequency parameter information, and the radio frequency parameter information includes a receive frequency and a sampling frequency.

The receiving unit 1401 is further configured in the radio transformation module to receive a radio signal corresponding to the receive frequency according to the receive frequency.

The sampling processing unit 1402 is configured in the radio transformation module to perform, according to the sampling frequency, sampling processing on the radio signal received by the receiving unit 1401, to obtain a digital signal.

The sending unit 1403 is configured in the radio transformation module to send, to the router, the digital signal that is obtained by the sampling processing unit 1202 by performing sampling processing.

Figure 15:
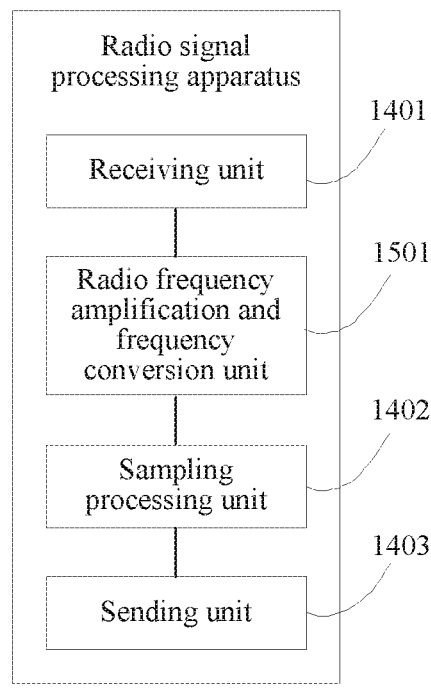
FIG. 15 is a schematic structural diagram of another radio signal processing apparatus according to an embodiment of the disclosure.

Further, as shown in FIG. 15, the apparatus further includes a radio frequency amplification and frequency conversion processing unit 1501.

The radio frequency amplification and frequency conversion processing unit 1501 is configured in the radio transformation module to perform radio frequency amplification and frequency conversion processing on the radio signal, to obtain a signal after the radio frequency amplification and frequency conversion.

The sending unit 1403 is configured in the radio transformation module to send the digital signal to the router by using a USB.

By means of the radio signal processing apparatus provided in this embodiment of the disclosure, the radio transformation module first receives a receive command that is sent by the router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using the radio signal receiving module, in this embodiment of the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

Further, by means of the radio signal processing apparatus provided in this embodiment of the disclosure, by using a receive frequency, the radio transformation module can receive a radio signal corresponding to the receive frequency, so that the radio transformation module may receive different radio signals according to different receive frequencies, without having to use different receiving modules to receive different radio signals, and then radio signal receiving complexity can be reduced. By using a sampling frequency carried in a received receive command, the radio transformation module can perform sampling processing on the radio signal, so that the radio transformation module may perform sampling according to different radio signals, to obtain different radio signals, without having to use different modules to obtain different sampled signals, and then radio signal processing complexity can be further reduced.

Figure 16:
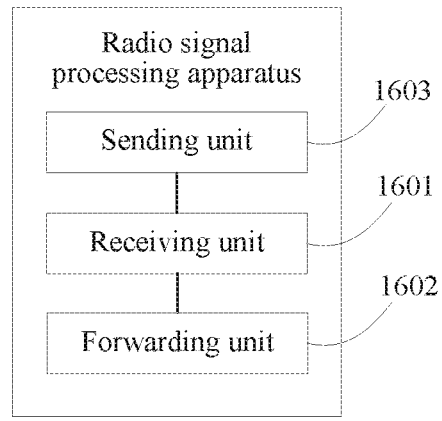
FIG. 16 is a schematic structural diagram of still another radio signal processing apparatus according to an embodiment of the disclosure.

Further, as an implementation of the methods shown in FIG. 10 and FIG. 11, an embodiment of the disclosure further provides still another radio signal processing apparatus. The apparatus may be located in a router, and configured to reduce radio signal processing complexity. As shown in FIG. 16, the apparatus includes a receiving unit 1601, a forwarding unit 1602, and a sending unit 1603.

The receiving unit 1601 is configured in the router to receive a receive command sent by user equipment.

The receive command carries radio frequency parameter information, and the radio frequency parameter information includes a receive frequency and a sampling frequency.

The forwarding unit 1602 is configured in the router to forward, to a radio transformation module, the receive command received by the receiving unit 1601.

The receiving unit 1601 is further configured in the router to receive a first signal sent by the radio transformation module.

The first signal is a signal that is obtained after the radio transformation module receives a radio signal according to the receive frequency and samples the radio signal according to the sampling frequency.

The sending unit 1603 is configured in the router to send the first signal to the user equipment.

Figure 17:
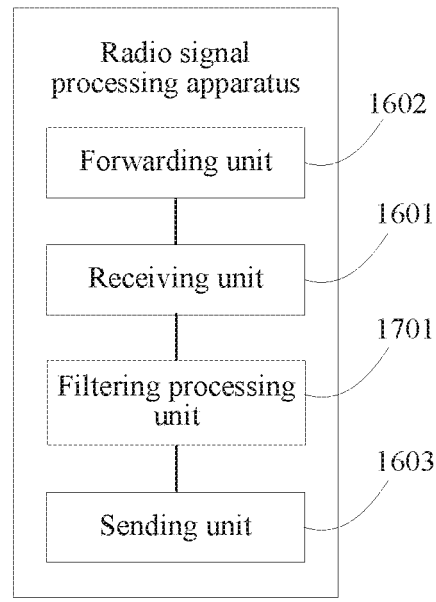
FIG. 17 is a schematic structural diagram of yet another radio signal processing apparatus according to an embodiment of the disclosure.

Further, as shown in FIG. 17, the apparatus further includes a filtering processing unit 1701.

The filtering processing unit 1701 is configured in the router to perform, by using a software radio technology, filtering processing on the first signal received by the receiving unit 1601.

By means of the radio signal processing apparatus provided in this embodiment of the disclosure, the router first receives a receive command that is sent by the user equipment and that carries a receive frequency and a sampling frequency, and forwards the receive command to the radio transformation module; then the router receives a signal that is obtained after the radio transformation module receives a radio signal according to the receive frequency and samples a signal for sampling according to the sampling frequency; and finally the router sends a digital signal to the user equipment. Compared with that currently a radio signal is received and processed by using the radio signal receiving module, in this embodiment of the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

Further, by means of the radio signal processing apparatus provided in this embodiment of the disclosure, the router may perform filtering processing on a digital signal in aspects of time and frequency, so that bandwidth used by the digital signal can be reduced. In this embodiment of the disclosure, by reducing network bandwidth used by a digital signal, the router can transmit an intermediate frequency digital signal to the user equipment by using relatively small bandwidth, so that a time to transmit the signal is reduced, and then user experience can be improved. By using the software radio technology, the router can perform filtering processing on a digital signal, so that when a function of the router is to be upgraded, only software is upgraded, without having to change hardware. Therefore, costs can be reduced, and the hardware can be simplified. On a network, by means of detection of whether phenomena such as a packet loss and an error packet occur in an encapsulated packet corresponding to a sampled signal, when an error occurs in network signal transmission, the router may re-transmit a lost digital signal or a digital signal in which an error occurs during the transmission, so that the user equipment can receive a complete digital signal, and radio signal receiving accuracy can be increased.

Figure 18:
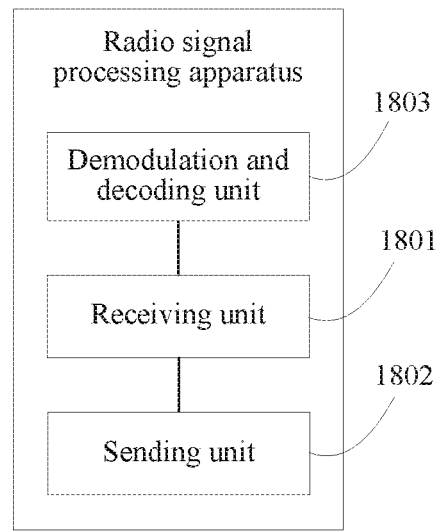
FIG. 18 is a schematic structural diagram of still yet another radio signal processing apparatus according to an embodiment of the disclosure.

Further, as an implementation of the methods shown in FIG. 12 and FIG. 13, an embodiment of the disclosure further provides still yet another radio signal processing apparatus. The apparatus may be located in a router, and configured to reduce radio signal processing complexity. As shown in FIG. 18, the apparatus includes a receiving unit 1801, a sending unit 1802, and a demodulation and decoding unit 1803.

The receiving unit 1801 is configured in user equipment to receive an operation instruction triggered by a user.

The sending unit 1802 is configured in the user equipment to send a receive command to the router according to the operation instruction received by the receiving unit 1801.

The receive command carries radio frequency parameter information, and the radio frequency parameter information includes a receive frequency and a sampling frequency.

The receiving unit 1801 is further configured in the user equipment to receive a second signal sent by the router.

The second signal is a signal that is obtained after the router forwards a first signal, and the first signal is a signal that is obtained after a radio transformation module receives the radio signal according to the receive frequency and the radio transformation module samples the radio signal according to the sampling frequency.

Optionally, the second signal is a radio signal that is obtained after the router filters and forwards the first signal by using the software radio technology.

The demodulation and decoding unit 1803 is configured in the user equipment to perform, by using a software radio technology, demodulation and decoding processing on the second signal received by the receiving unit 1801, to obtain a demodulated and decoded signal.

Figure 19:
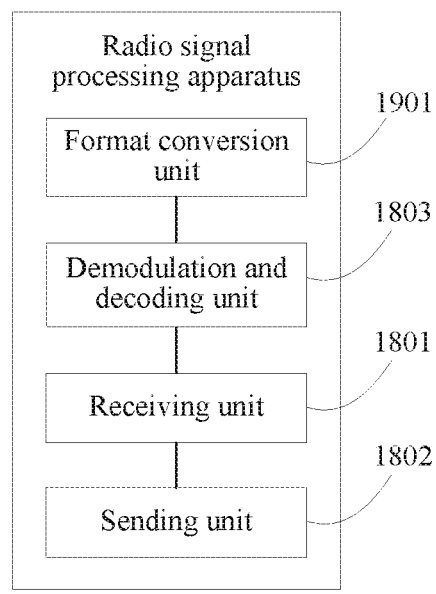
FIG. 19 is a schematic structural diagram of still yet further radio signal processing apparatus according to an embodiment of the disclosure.

Optionally, as shown in FIG. 19, the apparatus further includes a format conversion unit 1901.

The format conversion unit 1901 is configured in the user equipment to perform format conversion processing on the demodulated and decoded radio signal processed by the demodulation and decoding unit 1803, to obtain a signal that can be output by the user equipment.

It should be noted that, for other corresponding description corresponding to the units in radio signal processing provided in this embodiment of the disclosure, refer to the corresponding description in FIG. 2 and FIG. 4. Details are not described herein again.

Figure 20:
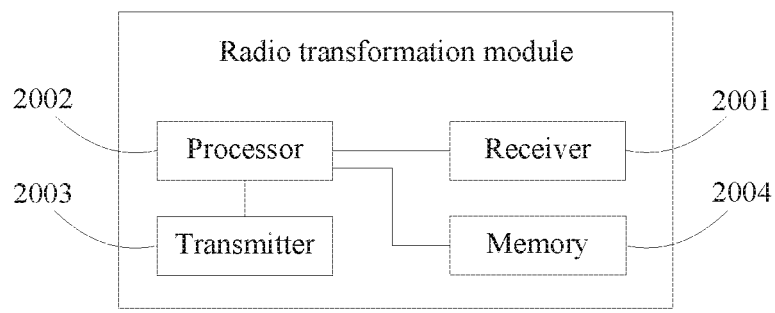
FIG. 20 is a schematic structural diagram for radio signal processing according to an embodiment of the disclosure.

Still further, an embodiment of the disclosure further provides a radio transformation module. As shown in FIG. 20, the radio transformation module includes a receiver 2001, a processor 2002, a transmitter 2003, and a memory 2004, where the transmitter 2003, the receiver 2001, and the memory 2004 are separately connected to the processor 2002.

The receiver 2001 is configured in a radio transformation module to receive a receive command sent by a router.

The receive command carries radio frequency parameter information, and the radio frequency parameter information includes a receive frequency and a sampling frequency.

The receiver 2001 is further configured in the radio transformation module to receive a radio signal corresponding to the receive frequency according to the receive frequency.

The processor 2002 is configured in the radio transformation module to perform, according to the sampling frequency, sampling processing on the radio signal received by the receiver 2001, to obtain a digital signal.

The transmitter 2003 is configured in the radio transformation module to send, to the router, the digital signal that is obtained by the processor 2002 by performing sampling processing.

The processor 2002 is further configured in the radio transformation module to perform radio frequency amplification and frequency conversion processing on the radio signal, to obtain a signal after the radio frequency amplification and frequency conversion.

The transmitter 2003 is further configured in the radio transformation module to send the digital signal to the router by using a USB interface.

It should be noted that, for other corresponding description corresponding to the units in radio signal processing provided in this embodiment of the disclosure, refer to the corresponding description in FIG. 8 and FIG. 9. Details are not described herein again.

By means of the radio transformation module provided in this embodiment of the disclosure, the radio transformation module first receives a receive command that is sent by a router and that carries a receive frequency and a sampling frequency; then receives a radio signal corresponding to the receive frequency according to the receive frequency; and finally performs sampling processing on the radio signal according to the sampling frequency, to obtain a digital signal, and sends the digital signal to the router. Compared with that currently a radio signal is received and processed by using the radio signal receiving module, in this embodiment of the disclosure, by receiving a receive command that is sent by the router and that carries a receive frequency and a sampling frequency, the radio transformation module can receive a radio signal corresponding to the receive frequency, and can perform sampling processing on the radio signal according to the sampling frequency, so that different radio signals may be received and processed by using only one radio transformation module according to different receive frequencies and sampling frequencies carried in different receive commands sent by the router, and then the radio signal may be sent to the router. Therefore, radio signal processing complexity can be greatly reduced.

Further, by means of the radio transformation module provided in this embodiment of the disclosure, by using a receive frequency, the radio transformation module can receive a radio signal corresponding to the receive frequency, so that the radio transformation module may receive different radio signals according to different receive frequencies, without using different receiving modules to receive different radio signals, and then radio signal receiving complexity can be reduced. By using a sampling frequency carried in a received receive command, the radio transformation module can perform sampling processing on the radio signal, so that the radio transformation module may perform sampling according to different radio signals, to obtain different radio signals, without using different modules to obtain different sampled signals, and then radio signal processing complexity can be further reduced.

Figure 21:
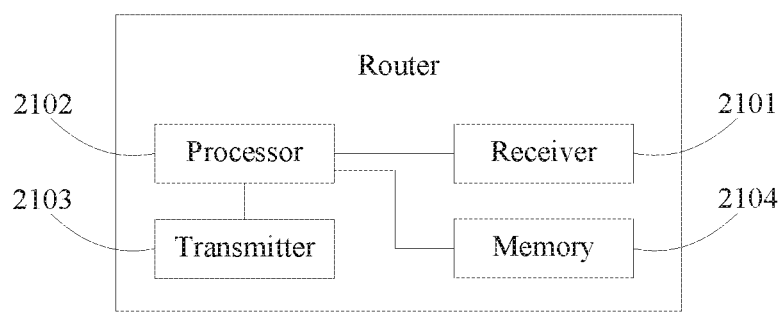
FIG. 21 is a schematic structural diagram for another radio signal processing according to an embodiment of the disclosure.

Still further, an embodiment of the disclosure further provides a router. As shown in FIG. 21, the router includes a receiver 2101, a processor 2102, a transmitter 2103, and a memory 2104, where the receiver 2101, the transmitter 2103, and the memory 2104 are separately connected to the processor 2102.

The receiver 2101 is configured in the router to receive a receive command sent by user equipment.

The receive command carries radio frequency parameter information, and the radio frequency parameter information includes a receive frequency and a sampling frequency.

The processor 2102 is configured in the router to forward, to a radio transformation module, the receive command received by the receiver 2101.

The receiver 2101 is further configured in the router to receive a first signal sent by the radio transformation module.

The first signal is a signal that is obtained after the radio transformation module receives a radio signal according to the receive frequency and samples the radio signal according to the sampling frequency.

The transmitter 2103 is configured in the router to send the first signal to the user equipment.

The processor 2102 is configured in the router to perform, by using a software radio technology, filtering processing on the first signal received by the receiver 2101.

It should be noted that, for other corresponding description corresponding to the units in radio signal processing provided in this embodiment of the disclosure, refer to the corresponding description in FIG. 10 and FIG. 11. Details are not described herein again.

By means of the router provided in this embodiment of the disclosure, the router first receives a receive command that is sent by the user equipment and that carries a receive frequency and a sampling frequency, and forwards the receive command to the radio transformation module; then the router receives a signal that is obtained after the radio transformation module receives a radio signal according to the receive frequency and samples a signal for sampling according to the sampling frequency; and finally the router sends a digital signal to the user equipment. Compared with that currently a radio signal is received and processed by using the radio signal receiving module, in this embodiment of the disclosure, a radio signal that carries a receive frequency and a sampling frequency is received and forwarded, so that the radio transformation module can receive and process the radio signal according to the receive frequency and the sampling frequency, that is, the radio transformation module can receive and process different radio signals according to the receive frequency and the sampling frequency that are received and forwarded. Therefore, radio signal processing complexity can be greatly reduced.

Further, by means of the router provided in this embodiment of the disclosure, the router may perform filtering processing on a digital signal in aspects of time and frequency, so that bandwidth utilized by the digital signal can be reduced. In this embodiment of the disclosure, by reducing network bandwidth utilized by a sampled signal, the router can transmit a digital signal to the user equipment by using relatively small bandwidth, so that a time used to transmit the signal is reduced, and then user experience can be improved. By using the software radio technology, the router can perform filtering processing on a digital signal, so that when a function of the router is to be upgraded, only software is to be upgraded, without having to change hardware. Therefore, costs can be reduced, and the hardware can be simplified. On a network, by means of detection of whether phenomena such as a packet loss and an error packet occur in an encapsulated packet corresponding to a sampled signal, when an error occurs in network signal transmission, the router may re-transmit a lost digital signal or a digital signal in which an error occurs during the transmission, so that the user equipment can receive a complete digital signal, and radio signal receiving accuracy can be increased.

Figure 22:
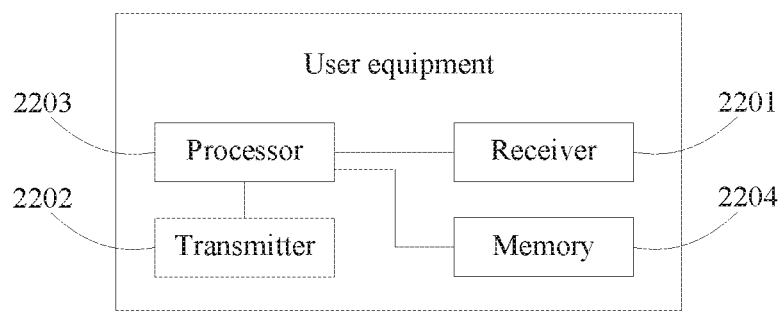
FIG. 22 is a schematic structural diagram for still another radio signal processing according to an embodiment of the disclosure.

Still further, an embodiment of the disclosure further provides user equipment. As shown in FIG. 22, the user equipment includes a receiver 2201, a transmitter 2202, a processor 2203, and a memory 2204, where the receiver 2201, the transmitter 2202, and the memory 2204 are separately connected to the processor 2203.

The receiver 2201 is configured in the user equipment to receive an operation instruction triggered by a user.

The transmitter 2202 is configured in the user equipment to send a receive command to the router according to the operation instruction received by the receiver 2201.

The receive command carries radio frequency parameter information, and the radio frequency parameter information includes a receive frequency and a sampling frequency.

The receiver 2201 is configured in the user equipment to receive a second signal sent by the router.

The second signal is a signal that is obtained after the router forwards a first signal, and the first signal is a signal that is obtained after a radio transformation module receives the radio signal according to the receive frequency and the radio transformation module samples the radio signal according to the sampling frequency.

Optionally, the second signal is a radio signal that is obtained after the router filters and forwards the first signal by using the software radio technology.

The processor 2203 is configured in the user equipment to perform, by using a software radio technology, demodulation and decoding processing on the second signal received by the receiver 2201, to obtain a demodulated and decoded signal.

The processor 2203 is configured in the user equipment to perform format conversion processing on the demodulated and decoded radio signal, to obtain a signal that can be output by the user equipment.

It should be noted that, for other corresponding description corresponding to the devices in radio signal processing provided in this embodiment of the disclosure, refer to the corresponding description in FIG. 12 or FIG. 13. Details are not described herein again.

By means of the user equipment provided in this embodiment of the disclosure, the user equipment first sends a receive command that carries a receive frequency and a sampling frequency to the router; then receives a signal that is obtained after the radio transformation module samples, according to the sampling frequency, a radio signal that is sent by the router and that is received by the radio transformation module according to the receive frequency; and finally performs demodulation and decoding processing on a digital signal by using a software radio technology, to obtain a demodulated and decoded signal. Compared with that currently a radio signal is received and processed by using a radio signal receiving module, in this embodiment of the disclosure, the user equipment sends a receive command that carries a receive frequency and a sampling frequency to the router, so that the router can forward the receive command to the radio transformation module, and the radio transformation module receives and processes a radio signal according to the receive frequency and the sampling frequency, that is, by sending the receive command that carries the receive frequency and the sampling frequency to the router, the user equipment obtains the radio signal, without having to change different receiving and processing modules. Therefore, radio signal processing complexity can be greatly reduced.

Further, by means of the user equipment provided in this embodiment of the disclosure, by sending a receive command to the radio transformation module according to a demodulation result, the user equipment can enable the radio transformation module to adjust, according to the receive command, parameter information such as a frequency and a gain for radio signal receiving and processing, so that accuracy of receiving, by the radio transformation module, a radio signal can be increased. By changing different software, the user equipment can perform, according to the different software, processing such as demodulation, decoding, and format conversion on information received by the user equipment, that is, on the premise of not changing hardware, multiple functions are implemented by upgrading software, so that costs can be reduced, and user experience can be improved.

The radio signal processing apparatuses provided in the embodiments of the disclosure can implement the method embodiments provided in the foregoing. For specific function implementations, refer to the description in the method embodiments. Details are not described herein again. The radio signal processing system, method, and apparatus, the radio transformation module, the router, and the user equipment that are provided in the embodiments of the disclosure may be applicable for the radio transformation module, the router, and the user equipment to receive and process a radio signal according to a receive command sent by the user equipment, to obtain information used by the user equipment, but are not merely limited thereto.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

The foregoing descriptions are merely specific embodiments of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A radio signal processing system, comprising:
a radio processor;
a router in communication with the radio processor; and user equipment in communication with the radio processor and the router, the user equipment being configured to:
receive an operation instruction; and
send a receive command to the router according to the operation instruction, the receive command comprising a radio frequency parameter comprising a receive frequency and a sampling frequency, the router being configured to forward the receive command to the radio processor after receiving the receive command from the user equipment, the radio processor being configured to:
receive the receive command from the router;
receive a radio signal corresponding to the receive frequency according to the receive command;
perform sampling processing on the radio signal according to the sampling frequency to obtain a digital signal; and
send the digital signal to the router, and the router being configured to:
receive the digital signal from the radio processor; and
forward the digital signal to the user equipment, and the user equipment being configured to:
receive a second signal from the router that is obtained after receiving the digital signal from the router; and
perform demodulation and decoding processing on the second signal by using a software radio technology to obtain a demodulated and decoded signal.

2. The radio signal processing system of claim 1, wherein the radio processor is further configured to:
perform radio frequency amplification and frequency conversion processing on the radio signal prior to performing the sampling processing on the radio signal according to the sampling frequency; and
send the digital signal to the router by using a universal serial bus interface.

3. The radio signal processing system of claim 1, wherein the router is further configured to perform filtering on the digital signal by using the software radio technology before the router sends the digital signal to the user equipment.

4. The radio signal processing system of claim 3, wherein the second signal is obtained after the router performs filtering and forwarding of the digital signal by using the software radio technology.

5. The radio signal processing system of claim 1, wherein the user equipment is further configured to:
perform format conversion processing on the demodulated and decoded signal to obtain a third signal after the user equipment performs demodulation and decoding processing on the second signal; and
output the third signal.

6. A radio signal processing method for a radio transformation processor, comprising:
receiving, by the radio transformation processor, a receive command from a router, the receive command comprising a radio frequency parameter, and the radio frequency parameter comprising a receive frequency and a sampling frequency;
receiving, by the radio transformation processor, a radio signal corresponding to the receive frequency according to the receive command;
performing, by the radio transformation processor, sampling processing on a first signal according to the sampling frequency to obtain a digital signal; and
sending, by the radio transformation processor, the digital signal to the router.

7. The radio signal processing method of claim 6, further comprising performing radio frequency amplification and frequency conversion processing on the radio signal to obtain the first signal before performing the sampling processing on the first signal.

8. The radio signal processing method of claim 7, wherein sending the digital signal to the router comprises sending the digital signal to the router by using a USB interface.

9. The radio signal processing method of claim 6, wherein sending the digital signal to the router comprises sending the digital signal to the router by using a universal serial bus (USB) interface.

10. A radio signal processing system, comprising:
a receiver configured to:
receive a receive command from a router, the receive command comprising radio frequency parameter information, and the radio frequency parameter information comprising a receive frequency and a sampling frequency; and
receive a radio signal corresponding to the receive frequency according to the receive command;
a processor coupled to the receiver and configured to perform, according to the sampling frequency, sampling processing on a processed signal to obtain a digital signal; and
a transmitter coupled to the processor and configured to send the digital signal to the router.

11. The radio signal processing system of claim 10, wherein the processor is further configured to perform radio frequency amplification and frequency conversion processing on the radio signal to obtain the processed signal.

12. The radio transformation module of claim 11, wherein the transmitter is further configured to send the digital signal to the router by using a universal serial bus (USB) interface.

13. The radio signal processing system of claim 10, wherein the transmitter is further configured to send the digital signal to the router by using a universal serial bus (USB) interface.

* * * * *